(12) United States Patent
Hu et al.

(10) Patent No.: US 12,463,816 B2
(45) Date of Patent: Nov. 4, 2025

(54) DECENTRALIZED ZERO-TRUST IDENTITY VERIFICATION-AUTHENTICATION SYSTEM AND METHOD

(71) Applicants: Pei-Hua Hung, New Taipei (TW); Cheng-Chang Tseng, Taipei (TW)

(72) Inventors: Shih-Hsien Hu, New Taipei (TW); Cheng-Chang Tseng, Taipei (TW)

(73) Assignees: Pei-Hua Hung, New Taipei (TW); Cheng-Chang Tseng, Taipei (TW)

( * ) Notice: Subject to any disclaimer, the term of this patent is extended or adjusted under 35 U.S.C. 154(b) by 103 days.

(21) Appl. No.: 18/690,038

(22) PCT Filed: Sep. 6, 2022

(86) PCT No.: PCT/CN2022/117346
§ 371 (c)(1),
(2) Date: Mar. 7, 2024

(87) PCT Pub. No.: WO2023/036143
PCT Pub. Date: Mar. 16, 2023

(65) Prior Publication Data
US 2025/0132919 A1 Apr. 24, 2025

Related U.S. Application Data

(60) Provisional application No. 63/241,111, filed on Sep. 7, 2021.

(51) Int. Cl.
*H04L 9/32* (2006.01)

(52) U.S. Cl.
CPC .......... *H04L 9/3218* (2013.01); *H04L 9/3231* (2013.01); *H04L 9/3278* (2013.01)

(58) Field of Classification Search
CPC ... H04L 9/3218; H04L 9/3231; H04L 9/3278; H04L 9/32; H04L 9/3239; H04L 9/00; H04L 9/50; G06F 21/00
See application file for complete search history.

(56) References Cited

U.S. PATENT DOCUMENTS

| 10,671,712 B1 | 6/2020 | Lindley et al. |
| 2018/0183586 A1 | 6/2018 | Bhargav-spantzel et al. |

(Continued)

FOREIGN PATENT DOCUMENTS

| CN | 101539995 | 5/2011 |
| CN | 102916968 | 2/2013 |

(Continued)

*Primary Examiner* — Izunna Okeke
(74) *Attorney, Agent, or Firm* — WPAT, PC

(57) ABSTRACT

An identity verification-authentication system and method are used for verifying and authenticating at least a first user. The system includes a first prover for acquiring a first unique feature provided by the first user; and a verifier in communication with the first prover for generating a first proof request. The verifier sends a first variant data included in the first proof request to the first prover. The first prover generates a first to-be-compared answer data according to the first unique feature and the first variant data. The first prover or the verifier then generates a determination result according to a comparison of the first to-be-compared answer data and a first answer data included in the first proof request, and determines whether the identity verification and authentication of the first user is successfully according to the determination result.

16 Claims, 22 Drawing Sheets

(56) References Cited

U.S. PATENT DOCUMENTS

2024/0022565 A1* 1/2024 Keith, Jr. ............ H04L 63/0861
2025/0165575 A1* 5/2025 Blackburn ........... G06Q 20/405

FOREIGN PATENT DOCUMENTS

| CN | 103647534 | 3/2014 |
| --- | --- | --- |
| CN | 104468579 | 3/2015 |
| CN | 109272317 | 1/2019 |
| CN | 109472647 | 3/2019 |
| CN | 112714108 | 4/2021 |
| TW | 200534133 | 10/2005 |
| TW | 1591554 | 7/2017 |
| WO | 2020042462 | 3/2020 |
| WO | 2020092351 | 5/2020 |

* cited by examiner

```
{
    "timestamp": "2021-07-05 19:51:39",
    "challenger": "abcBank",
    "abcDef":["abcDef1", "abcDef2", "abcDef3"]
}
```

FIG.4A

```
{
    "biometrics": 1394,
    "garbler": 802,
    "rawdata": [
        46368,
        75025,
        121393,
        196418,
        317811,
        514229,
        832040,
        1346269,
        987,
        1597,
        2584,
        4181,
        6765,
        10946,
        17711,
        28657,
        102334155,
        165580141,
        267914296,
        433494437,
        701408733,
        1134903170,
        1836311903,
        2971215073,
        2178309,
        3524578,
        5702887,
        9227465,
        14930352,
        24157817,
        39088169,
        63245986
    ]
}
```

FIG.4B

```
{
  "timestamp": "2021-07-05 19:51:39",
  "challenger": "abcBank",
  "protocol": 101,
  "abcDef":["abcDef1", "abcDef2", "abcDef3"]
}
```

FIG.4C

```
{
  "timestamp": "2021-07-05 19:51:39",
  "hash": "6a09e667bb67ae853c6ef372a54ff53a510e527f9b05688c1f83d9ab5be0cd19",
  "previousHash": "428a2f98713744491b5c0fbcfe9b5dba53956c25b59f111f1923f82a4ab1c5ed5",
  "nonce": "d807aa98",
  "id": "1234567890",
  "abcDeF":["abcDeF1", "abcDeF2", "abcDeF3", ...., "abcDeF256"]
}
```

FIG.4D

```
{
  "timestamp": "2021-07-05 19:51:39",
  "hash": "6a09e667bb67ae853c6ef372a54ff53a510e527f9b05688c1f83d9ab5be0cd19",
  "previousHash": "428a2f98713744491b5c0fbcfe9b5dba53956c25b59f111f1923f82a4ab1c5ed5",
  "nonce": "d807aa98",
  "dezeta": "1234567890",
  "id": "did:zeta:sov:WRfXPg8dantKVubE3HX8pw",
  "publicKey": "H3C2AVvLMv6qmMNam3uVAjZpfkcJCwDwnZn6z3wXmqPV",
  "abcDeF":["abcDeF1", "abcDeF2", "abcDeF3",....., "abcDeF256"]
}
```

FIG.4E

```
{
  "timestamp": "2021-07-05 19:51:39",
  "hash": "6a09e667bb67ae853c6ef372a54ff53a510e527f9b05688c1f83d9ab5be0cd19",
  "previousHash": "428a2f98713744491b5c0fbcfe9b5dba53956c25b59f111f1923f82a4ab1c5ed5",
  "nonce": "d807aa98",
  "dezeta": "1234567890",
  "id": "did:zeta:sov:WRfXPg8dantKVubE3HX8pw",
  "abcDeF":["abcDeF1", "abcDeF2", "abcDeF3",....., "abcDeF256"]
}
```

FIG.4F

|   |   |   |   |
|---|---|---|---|
| 0 | 0 | X | 0 |
| 0 | X | 0 | 0 |
| 0 | 0 | 0 | X |
| 0 | X | 0 | 0 |

FIG.7A

|   |   |   |   |
|---|---|---|---|
| 0 | 0 | 1 | 0 |
| 0 | 1 | 0 | 0 |
| 0 | 0 | 0 | 1 |
| 0 | 1 | 0 | 0 |

FIG.7B

```
{
  "pin": 1394,
  "rawdata": "3dFADB7391e63ACb7bBde7E4075CAc46Ba6E4DC0"
}
```

```
{
    "pin": 1394,
    "garbler": 802,
    "rawdata": "3dFADB7391e63ACb7bBde7E4075CAc46Ba6E4DC0"
}
```

FIG.8D

DECENTRALIZED ZERO-TRUST IDENTITY VERIFICATION-AUTHENTICATION SYSTEM AND METHOD

BACKGROUND OF THE INVENTION

1. Field of the Invention

The present application is a decentralized zero-trust identity verification-authentication system and method, especially is a decentralized zero-trust identity verification-authentication system and method applied to communication devices, Internet and Internet of Things (IoT) objects.

2. The Prior Arts

In current business transactions, there is a frequent need that uses remote devices for online identity authentication. Whether it is an online banking, a shopping website or a social media, users are required to complete the registration process first, and then they authenticate the user's identity during the login process, thereby allowing the user enter the website and perform normal operations. For example, when a customer sets up an online banking account, the customer will first be asked for identification, the identification is just a process in which the customer claims that he/she is a specific person, the identification mainly involves filling information of name, address, ID number and the like in the account application form, and further adding images captured from dual ID cards (by using a specific application program issued by the online banking). The bank then needs to conduct a verification process for verifying that the customer is who he/she claims to be. The verification process can be that the bank clerks check an official identity document submitted by the customer to compare whether the name, the address, ID card number and other information in the application form are consistent with the information on the official identity document, even compare a photo on the official document and the customer's appearance to determine whether the two are the same person; or, the customer can further submit information that can be used for credit reference (such as a natural person certificate issued by the government, or other banking accounts that have been established and passed the verification, or social identity that has been registered in credible online communities such as Google, Facebook); finally, the bank established a trustworthy association between the identity claimed by the customer and their true identity. Once the above verification process is completed, when the customer wants to conduct a transaction (such as online transfer) through the online banking account, the customer does not need to go through the cumbersome verification process again, it can be replaced by a simpler authentication process. For example, the bank host will only check the secret (such as a fingerprint, a face image, a handwritten signature, a user name and password) that the customer submitted on the time of applying the account and stored in the bank, to perform the authentication process. Once a token provided (such as the fingerprint, the face image, the handwritten signature, the user name and password) by the customer is correct through a comparison of the secret and the token, the bank will directly determine that the customer and the person who registered the online account are the same person, and the customer can carry out various trading activities normally.

However, in the aforesaid traditional method, the users must store the secret (such as the aforesaid fingerprint, the face image, the handwritten signature, the user name and password) that should not be disclosed in the bank host, it results in the bank having to bear a burden of keeping secrets. Once the secrets are stolen or used fraudulently, the bank must bear risks of financial or credit losses. Therefore, most of new authentication process are toward passwordless methods where the authentication actions and responsibilities are on the user side (such as smartphones), for example, the common method promoted by Fast Identity Online (FIDO) alliance. However, such methods transfer the responsibilities of keeping secrets and authenticating identity to the users, and the risks are borne by the users. In such way, when a malicious person cracks the user's smartphone to obtain a right to use a private key in the public-private key pair, even to replace the public key of the bank side, the method promoted by FIDO alliance is also unable to effectively block such attacks, and it results in the problem of bank account still being compromised.

SUMMARY OF THE INVENTION

Based on the above description, it can be seen that the current identity authentication methods still have the problems that the user must leave the secret capable of proving the identity in the bank host or the user device, and over relies on the security of one side to avoid theft. Further, because the user's biometric feature must be stored in the user device, the bank host, or a third-party authentication agency, once it is cracked and obtained, all applications that are kept confidential thereby will be compromised. How to improve the various problems and deficiencies of the above methods is the main purpose of developing the technical means of the present application.

The present application is mainly related to an identity verification-authentication method, for verifying and authenticating a user, the method includes: acquiring a unique feature provided by the user, and generating a first digital token which includes a first variant unique feature according to the unique feature and a first variant data; generating a first proof request according to the first digital token, wherein the first proof request at least includes the first variant data and a first answer data, and the first answer data includes the first variant unique feature; acquiring a to-be-authenticated unique feature corresponding to a to-be-verified-authenticated user, and generating a first to-be-compared answer data according to the to-be-authenticated unique feature of the to-be-verified-authenticated user and the first variant data in the first proof request; generating a first determination result according to a comparison of the first to-be-compared answer data and the first answer data in the first proof request; and determining whether the to-be-verified-authenticated user is the user according to the first determination result.

According to the aforesaid scheme, the identity verification-authentication method of the present application further includes following steps: generating a second digital token which includes a second variant unique feature according to the unique feature and a second variant data; generating a second proof request according to the second digital token, wherein the second proof request at least includes the second variant data and a second answer data, and the second answer data includes the second variant unique feature; generating a second to-be-compared answer data according to the to-be-authenticated unique feature of the to-be-verified-authenticated user and the second variant data in the second proof request; generating a second determination result according to a comparison of the second to-becompared answer data and the second answer data in the second proof request; and determining whether the to-be-verified-authenticated user is the user according to the first determination result and the second determination result.

According to the aforesaid scheme, in the identity verification-authentication method of the present application, the user is one of a natural person, an information device, a robot, an Internet of Things (IoT) object, and an asset object having the unique feature; the unique feature of the natural person is a secret that the user keeps with him/her and can take out repeatedly, the secret is one of a combination of a personal identification number (PIN) in memory, a handwritten signature or symbol, a pass code pronounced by himself/herself, a special gesture or habitual body movement, and one or more biometric features; the unique feature of the information device, the robot, the IoT object, or the asset object is an electronic fingerprint, which is generated by a physically unclonable function (PUF) security technology in an integrated circuit chip, or the electronic fingerprint added with specific location information of the information device, the robot, the IoT object, or the asset object.

According to the aforesaid scheme, in the identity verification-authentication method of the present application, the first variant data included in the first proof request is an information required to generate the first answer data, the first answer data can be generated by the user in an avatar producing stage utilizing the unique feature thereof and the first variant data, the first answer data is stored in an accessible database, and the unique feature cannot be reversely extrapolated according to the first answer data and the first variant data; the database is a public but untemperable digital ledger system having a plurality of proof request sub-questions stored therein, each one of the proof request sub-questions can include a variant data and an answer data corresponding to a specific user; in response to a verification request issued by the user, a proof question set and an answer set can be selected and generated from the plurality of proof request sub-questions in the database according to an identity code representing the user, the determination result is generated according to a comparison of the proof question set and a to-be-compared answer set generated corresponding to the proof question set, and then whether the identity verification-authentication of the user is successful is determined according to the determination result being consistent with the answer set or not.

Another aspect of the present application is an identity verification-authentication system, for verifying and authenticating at least a first user, the system includes: a first prover, for acquiring a first unique feature provided by the first user; and a verifier, in communication with the first prover, for generating a first proof request, wherein the verifier at least sends a first variant data in the first proof request to the first prover, the first prover generates a first to-be-compared answer data according to the first unique feature provided by the first user and the first variant data, the first prover or the verifier generates a determination result according to a comparison of the first to-be-compared answer data and a first answer data in the first proof request, and then determines whether an identity verification-authentication of the first user is successful according to the determination result.

According to the aforesaid scheme, in the identity verification-authentication system of the present application, the verifier sends the first variant data and the first answer data in the first proof request to the first prover, the first prover generates the first to-be-compared answer data according to the unique feature provided by the first user and the first variant data, the first prover generates the determination result according to the comparison of the first to-be-compared answer data and the first answer data in the first proof request, and the verifier determines whether the identity verification-authentication of the first user is successful according to the determination result.

According to the aforesaid scheme, in the identity verification-authentication system of the present application, the verifier only sends the first variant data in the first proof request to the first prover, the first prover generates the first to-be-compared answer data according to the unique feature provided by the first user and the first variant data, and sends the first to-be-compared answer data to the verifier, the verifier generates the determination result according to the comparison of the first to-be-compared answer data and the first answer data in the first proof request, and the verifier determines whether the identity verification-authentication of the first user is successful according to the determination result.

According to the aforesaid scheme, the identity verification-authentication system of the present application further includes: a second prover, for acquiring a second unique feature provided by the second user; the verifier, also in communication with the second prover, for generating a second proof request, wherein the verifier at least sends a second variant data in the second proof request to the second prover, the second prover generates a second to-be-compared answer data according to the second unique feature provided by the second user and the second variant data, the second prover or the verifier generates other one determination result according to a comparison of the second to-be-compared answer data and a second answer data in the second proof request, and then determines whether an identity verification-authentication of the second user is successful according to the other one determination result.

According to the aforesaid scheme, in the identity verification-authentication system of the present application, the verifier includes a proof request database having a plurality of proof request sub-questions stored therein, each one of the proof request sub-questions can include a variant data and an answer data corresponding to a specific user; and a verification executing unit, for selecting and generating a proof question set and an answer set from the plurality of proof request sub-questions in the proof request database according to an identity code included in a verification request, the first proof request is the proof question set generated according to the identity code of the first user, the first prover or the verification executing unit generates the determination result according to the comparison of the to-be-compared answer data and the first answer data in the proof request, and then determines whether the identity verification-authentication of the first user is successful according to the determination result being consistent with the answer set or not; wherein the identity code is selected from one of a decentralized identity (DID), an identity number belonging to the first user, a mobile phone number and a username defined by the first user, when the decentralized identity is selected as the identity code, the unique feature of the first user can be associated with a non-fungible token (NFT) on a blockchain, so as to achieve an effect that natural person own digital assets, a question bank of new proof request sub-questions is generated after an avatar producing stage of the first user and every important transaction, the plurality of proof request sub-questions can be deemed as the NFT belonging to the first user, the NFT represents a proof that the first user authorizes the important transaction, a group of the NFTs can be considered as the first user's personal credit rating record or even record of the unique feature that changes over time, these records can be pointed to the first user across devices, and can be used as important references in other services of health insurance, financial credit, or even a consensus mechanism on a blockchain.

According to the aforesaid scheme, in the identity verification-authentication system of the present application, the first prover includes a signal transceiver, in communication with the verifier, which takes out the first variant feature in the first proof request received; a parameter processing unit, in communication with the signal transceiver, which outputs a set of variation control parameters according to the first variant data; a biometric feature extracting unit, in communication with the parameter processing unit, which is used to extract at least one biometric feature of the first user, the biometric feature extracting unit has a variety of biometric feature extraction and conversion rules, can switch the biometric feature extraction and conversion rules according to a content of the variation control parameters output by the parameter processing unit, then switch the biometric feature extraction and conversion rule corresponding to the set of variation control parameters to perform biometric feature extraction and conversion, finally generate and send the first to-be-compared answer data including a variant biometric feature; and a comparison unit, in communication with the biometric extracting unit and the signal transceiver, which is used to compare the first to-be-compared answer data and the first answer data in the first proof request, and then to determine whether the two are consistent.

According to the aforesaid scheme, in the identity verification-authentication system of the present application, the biometric feature is the unique feature of single fingerprint, permutations and combinations of multiple fingerprints, voiceprint, a face, a handwritten signature or a gait, the first proof request includes a proof question set, data types of the proof question set includes a time stamp, a name issuing a challenge, a question combination composed of the plurality of proof request sub-questions, each one of the proof request sub-questions is taken from the proof request database; the first prover packages the comparing and the determining with a technology of multi-party computation, completes the comparison of the first to-be-compared answer data and the first answer data in the first proof request, to reduce computation of the first prover itself.

According to the aforesaid scheme, in the identity verification-authentication system of the present application, the first prover further includes a garbling unit and a de-garbling unit, a garbling operation is performed to any variant biometric feature data in a plurality of variant biometric feature by the garbling unit according to a garbler parameter, a garbled variant biometric feature data is generated and sent to a proof request database at a remote end for storage, to enrich numbers and types of proof request sub-questions in the proof request database; the de-garbling unit performs a de-garbling operation to the garbled variant biometric feature data of the first user, to get back the variant biometric feature data corresponding to the first user, and to send it to the comparison unit.

According to the aforesaid scheme, in the identity verification-authentication system of the present application, the first proof request sent by the verifier further includes an anti-eavesdropping protocol parameter determined by the verifier, the determination result obtained by the comparison unit is first passed through the garbling unit to generate a garbled determination result, and the comparison unit sends the garbled determination result to the verifier; the verifier de-garbles the garbled determination result received according to anti-eavesdropping protocol parameter determined thereby, so as to further determine whether the identity verification-authentication of the first user is successful.

According to the aforesaid scheme, the identity verification-authentication system of the present application further includes: a first user garbling corresponding unit exclusively belonging to the first user, the first user garbling corresponding unit has stored a garbler parameter table exclusively belonging to the first user that can be read by the parameter processing unit; the biometric feature extracting unit has the variety of biometric feature extraction and conversion rules, can switch the biometric feature extraction and conversion rules according to the content of the variation control parameters output by the parameter processing unit, and can generate the plurality of variant biometric features different each other while the same biometric feature is as a base; after the garbling unit performs the garbling operation to any variant biometric feature data in the plurality of variant biometric features according to the garbler parameter table read from the first user garbling corresponding unit and a garbler parameter generated by a random number, the garbled variant biometric feature data is generated and sent to the proof request database at the remote end through the signal transceiver, to enrich the numbers and types of the proof request sub-questions in the proof request database.

According to the aforesaid scheme, in the identity verification-authentication system of the present application, the proof request database in the verifier has stored the plurality of proof request sub-questions that are untamperable, and can be enriched by the proof request sub-questions that are generated and sent back by the first prover at a remote end; the first prover is an identity proof device having biometric feature extracting function, and the proof request sub-question sent back thereby includes a data packet of a biometric feature parameter, the garbler parameter and the garbled variant biometric feature data; the verifier includes a noise mixer, which is used to perform a sub-region partition to the first answer data in the proof request sub-question, and to select certain sub-regions for noise mixing, so as to increase difficulty of comparing the first answer data; the first prover can clearly indicate the regions with noise added and a method of adding noise, so that an answer array is obtained through the comparing, the sub-regions without noise added and the sub-regions with noise added are marked with different values respectively in the answer array, the sub-regions with noise added are further marked with different values depending on the method of adding noise, and then the answer array is sent to the verifier for further strong verification.

A further aspect of the present application is an identity verification-authentication method, for verifying and authenticating a digital avatar, the method includes following steps: generating a first digital token according to a unique feature corresponding to the digital avatar and a variant data; uploading the digital token to an untamperable digital ledger, wherein the digital token includes a variant unique feature related to the unique feature; generating a proof request according to the digital token on the untamperable digital ledger, wherein the proof request at least includes the variant data and an answer data, the answer data includes the variant unique feature; generating a to-be-compared answer data according to the variant data of the proof request and a to-be-authenticated unique feature corresponding to a to-be-authenticated digital avatar; generating a determination result according to a comparison of the to-be-compared answer data and the answer data in the proof request; and determining whether the to-be-authenticated digital avatar is the digital avatar according to the determination result.

A further aspect of the present application is a non-transferable ticket purchase and verification method, applied to a management and verification of the non-transferable ticket performed by a first user between a ticket management center and an admission ticket verifier, the method includes following steps: the first user obtaining a first non-transferable ticket from the ticket management center, wherein the first non-transferable ticket includes a one-time password and a proof request, the proof request includes a first variant unique feature and a first variant data, the first variant unique feature is generated by a variation operation by utilizing the variant data and a first unique feature provided by the first user; and when the first user uses the first unique feature belonging to himself/herself and the first variant data to successfully answer the proof request, the one-time password in the first non-transferable ticket can be opened to complete the ticket verification.

According to the aforesaid scheme, in the non-transferable ticket purchase and verification method of the present application, the first non-transferable ticket is a digital file, the first user utilizes a hardware held by himself/herself to download and install a tool program, the first user uses the tool program to purchase the first non-transferable ticket at the ticket management center which exists in a form of a website, after a transaction between the first user and the ticket management center is approved, the ticket management center requires the first user to utilize the hardware held by himself/herself and the tool program to extract the first unique feature that belongs to and is provided with himself/herself, then the variation operation is performed to the first unique feature according to the first variant data that is randomly selected, finally the first variant unique feature is formed and composed into the proof request, and the proof request is sent to the ticket management center; or the first user directly sends the DID thereof to the ticket management center, the ticket management center randomly selects the proof request sub-questions which had been generated by the first user according to the DID, to compose the proof request, the ticket management center encapsulates the OTP that is randomly selected and the proof request to form the first non-transferable ticket, and sends back it to the first user, to complete ticket delivery, the first non-transferable ticket can also record a time stamp when the first non-transferable ticket was first generated and stored, and the timestamp can also be recorded simultaneously in the data field corresponding to the first non-transferable ticket in the ticket management center, when the first non-transferable ticket is transferred to any other portable device similar to a smart phone again, the time stamp of the first non-transferable ticket can be set into another stored time, in order to reduce the time of checking the ticket, the latest storage time of the first non-transferable ticket is first checked, when the latest storage time thereof is consistent with the time of first generation and storage recorded in the ticket management center, the ticket will be directly passed; on contrast, when the latest storage time thereof is inconsistent with the first generation and storage time recorded in the ticket management center, at this time, the admission ticket verifier needs to require the ticket holder to use his/her own unique features to respond to the proof request, so as to open the OTP in the first non-transferable ticket.

A further aspect of the present application is an identity verification-authentication method, applied to a user device, which includes following steps: after the user device acquired a unique feature corresponding to a user, at least generating a variant unique feature according to the unique feature and a variant data; generating a proof request by utilizing the variant unique feature, wherein the proof request at least includes the variant data and an answer data, the answer data includes the variant unique feature, the proof request generated is stored in the user device, and the unique feature previously acquired is deleted; when a to-be-verified-authenticated user wants the user device enter a normal use state, the user device first acquires a to-be-authenticated unique feature corresponding to the to-be-verified-authenticated user, and generates a to-be-compared answer data according to the to-be-authenticated unique feature of the to-be-verified-authenticated user and the variant data in the proof request; generating a determination result according to a comparison of the to-be-compared answer data and the answer data in the proof request; and determining whether the to-be-verified-authenticated user is the user according to the determination result.

According to the aforesaid scheme, in the identity verification-authentication method of the present application, the user device is a carsharing, a motorcycle, a cryptocurrency cold wallet, a smartphone or a notebook computer, which completes integration with a system established by fast identity online (FIDO) alliance, the proof request will expire and become invalid after a number of uses or usage time exceeds a preset value; at the same time, the user device will ask the user to generate a new proof request to replace the expired proof request, and delete the unique feature acquired at that time; on a time of performing identity verification-authentication, the user device does not need to be online.

A further aspect of the present application is a method of signing digital contracts, applied to a plurality of users, which includes following steps: providing a digital contract; the digital contract issuing a corresponding proof request, which has encapsulated a content of the digital contract therein, to the plurality of users; when the plurality of users correctly response the corresponding proof requests according to the aforesaid identity verification and authentication method, the content of the digital contract can be correctly opened to allow the plurality of users read and confirm, and the digital contract will be signed and effective until all the plurality of users confirmed it.

The identity verification-authentication method of the present application can also be applied between IoT objects, the method includes following steps: providing an IoT object; in a hardware producing stage, giving the IoT object a corresponding and only identity code and a first unique feature, and utilizing the identity code and the first unique feature to generate at least a digital token and to store the digital token in a proof request database; in an initialization stage, performing an identity verification-authentication to the IoT object by a verifier using the aforesaid identity verification-authentication method, using a special information of a location of the IoT object that passed the identity verification-authentication as a second unique feature, and using the second unique feature and the first unique feature to further generate more proof request sub-questions, so as to enrich the proof request database; and in an operation stage, other one IoT object uses the aforesaid identity verification-authentication method, the first unique feature and the second unique feature are concurrently utilized to perform the identity verification-authentication of the other one IoT object.

The present application can also be a benefit sharing method, the method includes following steps: utilizing a dedicated application or a browser to access a portal website; in a stage of producing a avatar of a user, the user first obtaining a unique feature corresponding to the user through a user device, and generating a plurality of variant unique features according to the unique feature and a plurality of variant data, uploading the plurality of variant data-variant unique features to a database whose content cannot be tampered, after the plurality of variant data-variant unique features are successfully uploaded, a maintainer of the database maintainer, a provider of the dedicated application, a builder of the portal website or an advertiser issues benefits to an exclusive account of the user; and a third-party service provider linking to the database to obtain the plurality of variant data-variant unique features, in response to a to-be-verified-authenticated user using the dedicated application or the portal website to log into the third-party service, the third-party service provider generating a proof requests by utilizing the plurality of variant data-variant unique features, then using the identity verification and authentication method of claim 1 to perform the identity verification and authentication to the to-be-verified-authenticated user, wherein the third-party service provider who obtains the plurality of variant data—the variant unique features needs to provide corresponding benefits to the maintainer of the database, the provider of the dedicated application, the builder of the portal website.

In order to have a clearer understanding of the aforesaid concepts of the present invention, embodiments are provided below and described in detail accompanying with corresponding drawings.

BRIEF DESCRIPTION OF THE DRAWINGS

FIG. 4A is a diagram schematically illustrating a data format of a proof question set in a proof request provided by the present application. FIG. 4B is a diagram schematically illustrating a data format of a proof request sub-question in the proof question set provided by the present application. FIG. 4C is a diagram schematically illustrating another data format of the proof question set in the proof request provided by the present application. FIG. 4D is a diagram schematically illustrating a data format of the proof request sub-question uploaded on a blockchain by the present application. FIG. 4E is a diagram schematically illustrating the data format, used in another embodiment, of the proof request sub-question uploaded on the blockchain by the present application. FIG. 4F is a diagram schematically illustrating the data format, used in a further embodiment, of the proof request sub-question uploaded on the blockchain by the present application.

FIG. 7A is a diagram schematically illustrating partitioned sub-regions of the variant fingerprint data added with noise in the present application. FIG. 7B is an answer array corresponding to partitioned sub-regions of the variant fingerprint data added with noise in the present application.

FIG. 8D is a diagram schematically illustrating an example of another data format of the proof request sub-question related to PIN in the present application.

DETAILED DESCRIPTION OF THE PREFERRED EMBODIMENT

Figure 1A:
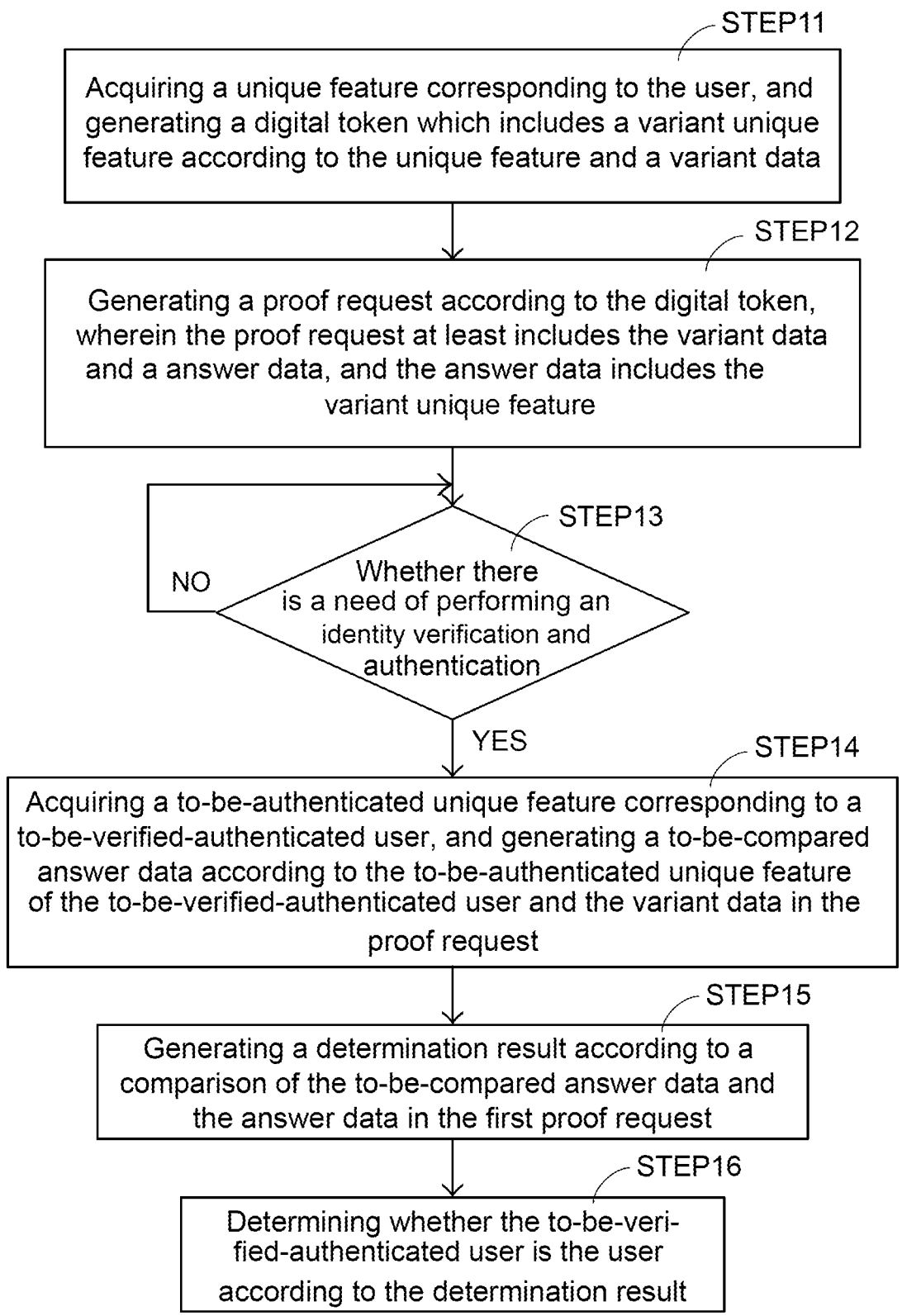
FIG. 1A is a flow chart schematically illustrating steps of an identity verification-authentication method developed by the present application.

In order to resolve the aforesaid problems, the present application mainly develop an identity verification-authentication method and a related system, which can be applied to an identity verification-authentication of at least a user, the method mainly includes steps as shown in FIG. 1A. Firstly, a unique feature corresponding to the user is acquires, and a digital token is generated according to the unique feature and a variant data, the digital token includes a variant unique feature (for example, the variant unique feature is generated according to the unique feature and the variant data.) (step 11), other one digital token can be generated according to the same unique feature and a different variant data, the other one digital token includes other one variant unique feature (for example, a first variant unique feature in a first digital token is generated according the unique feature and a first variant data, and a second variant unique feature in a second digital token is generated according to the unique feature and a second variant data.). Then, a proof request can be generated according to the digital token, the proof request at least includes the variant data and an answer data, the answer data includes the variant unique feature (step 12). When it is determined there is a need of performing identity verification and authentication (step 13), a to-be-authenticated unique feature corresponding to a to-be-verified-authenticated user is acquired, and a to-be-compared answer data according to the to-be-authenticated unique feature of the to-be-verified-authenticated user and the variant data in the proof request is generated (step 14). Then, a determination result is generated according to a comparison of the to-be-compared answer data and the answer data in the proof request (step 15). Finally, whether the to-be-verified-authenticated user is the user can be determined according to the determination result (step 16). The aforesaid user can be a natural person, an information device, a robot, an Internet of Things (IoT) object, and an asset object having the unique feature; the unique feature of the natural person is a secret that the user keeps with him/her and can take out repeatedly, the secret is one of a combination of a personal identification number (PIN) in memory, a handwritten signature or symbol, a pass code pronounced by himself/herself, a special gesture or habitual body movement, and one or more biometric features. The unique feature of the information device, the robot, the IoT object, or the asset object is an electronic fingerprint, which is generated by a physically unclonable function (PUF) security technology in an integrated circuit chip, or the electronic fingerprint added with specific location information (e.g. GPS location information) of the information device, the robot, the IoT object, or the asset object. As for the asset object having the unique feature, it can be an antique calligraphy, a painting, a jade, a music recording, a photography, etc., through various feature extracting means, certain unique features can be extracted from the aforesaid asset object, and then the technical means of the present application can be used to prove that it is authentic and not counterfeited or even fake. The unique feature of the asset object can be imperfections in gemstones, three-dimensional spatial measurement data of an interior of a house, or local line feature values of the painting, etc.

Figure 1B:
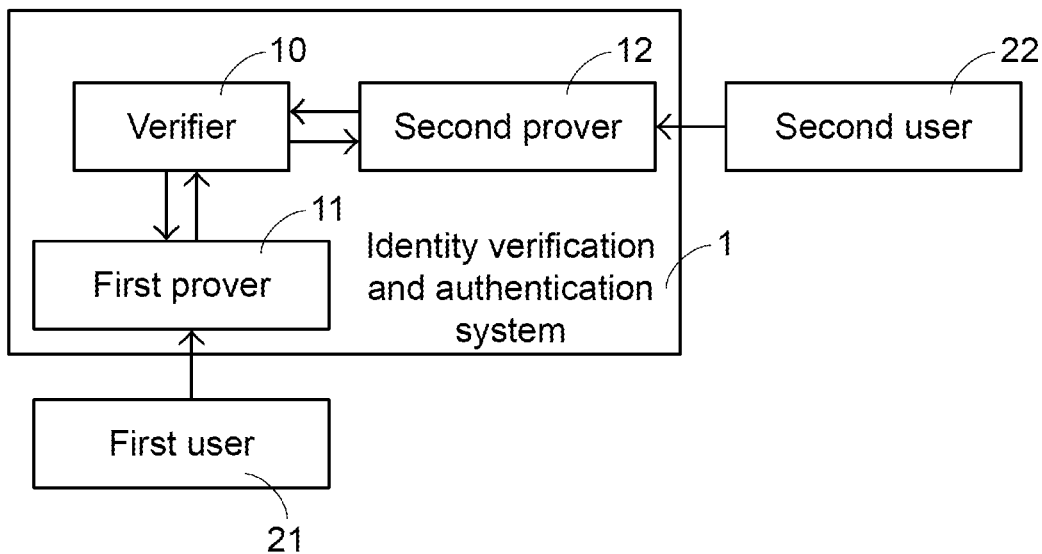
FIG. 1B is a functional block schematically illustrating a preferred embodiment of an identity verification-authentication system developed by the present application.
Figure 1C:
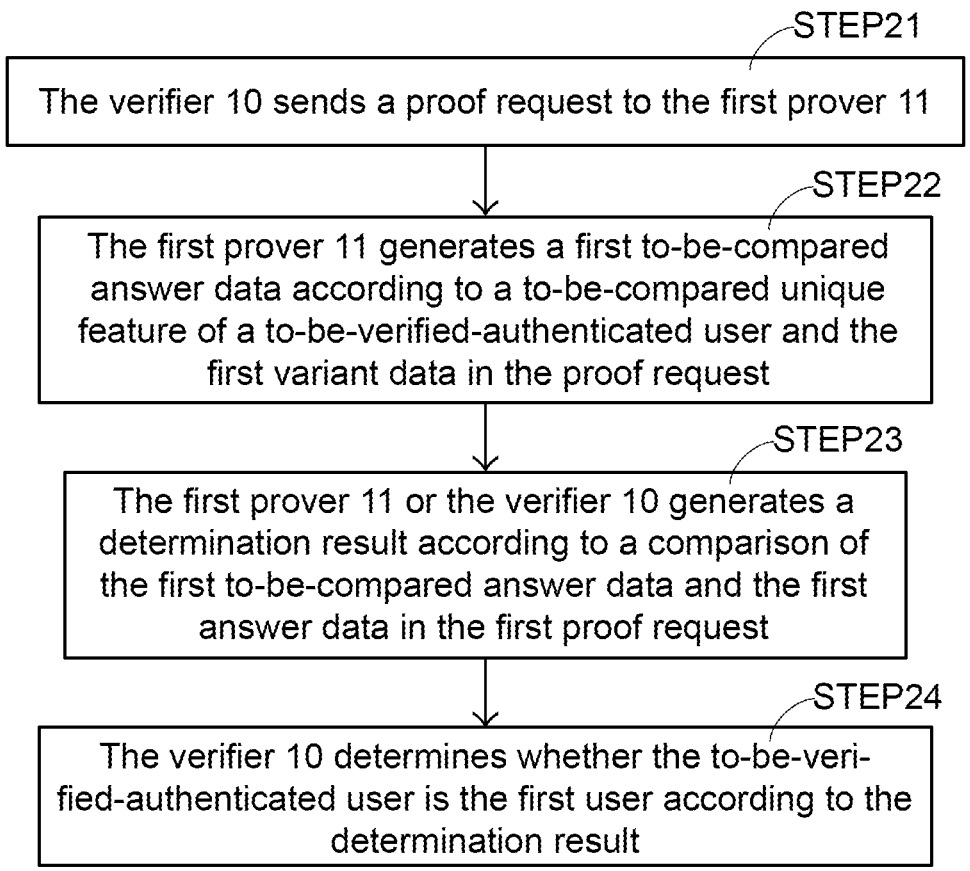
FIG. 1C is a flow chart schematically illustrating a preferred embodiment of the identity verification-authentication method that can be performed in the identity verification-authentication system of the present application.

In order to have a clearer understanding of the technical means and related preferred embodiments of the present application, please refer to FIG. 1B and FIG. 1C, which respectively show a functional block schematically illustrating a preferred embodiment of an identity verification-authentication system and a flow chart schematically illustrating a preferred embodiment of the identity verification-authentication method. Although the system and the method of the present application can be applied to multiple users, for a sake of concise description, a first user is taken as an example for explanation here first. The identity verification-authentication system 1 can be applied to verify and authenticate at least a first user, the system mainly includes a verifier 10 and a first prover 11, wherein the first prover 11 can acquire a unique feature corresponding to the first user 21. The verifier 10 is in communication with the first prover 11, and used for generating a proof request, the proof request at least includes a first variant data and a first answer data. The naming and understanding of the verifier and the prover in above and subsequent description can be replaced by using a challenger and a responder respectively, to correspond to nouns of a challenge-response authentication.

Details of the identity verification-authentication method can be a flow chart of a preferred embodiment shown in FIG. 1C, which includes following steps. The verifier 10 at least sends the proof request to the first prover 11 (step 21), the first prover 11 generates a first to-be-compared answer data according to a to-be-authenticated unique feature of the to-be-verified-authenticated user (e.g. the first user) and the first variant data in the proof request (step 22). One of the first prover 11 or the verifier 10 can be selected to generate a determination result according to a comparison of the first to-be-compared answer data and a first answer data in the proof request (step 23), and then the verifier 10 can determines whether the to-be-verified-authenticated user is the first user 21 (step 24). To take logging into a remote online banking account as an example, if the identity verification-authentication of step 24 is successful, then the to-be-verified-authenticated user (i.e. the first user 21) is allowed to carry out various trading activities normally. Certainly, the identity verification-authentication method provided by the present application can also be a second factor in addition to the account password, when the user logs into the remote account. On contrast, if the to-be-verified-authenticated user cannot provide the unique feature to generate the correct first to-be-compared answer data, then the identity verification-authentication cannot be passed, and the to-be-verified-authenticated user is not considered as the first user 21, so he/she cannot log into the remote account to carry out various trading activities.

If a design of identity verification-authentication system disclosed in the present application selects the first prover 11 to compare the first to-be-compared answer data and the first answer data and to generate the determination result, a content of the proof request sent to the prover 11 must include the first variant data and the first answer data, then the first prover 11 will send the determination result generated to the verifier 10, so that the verifier 10 can determine whether the identity verification-authentication of the first user is successful according to the determination result obtained. The first prover 11 can also package the comparing and the determining with a technology of multi-party computation, complete the answer comparing and the determining by using edge computing architecture, to reduce computation of the first prover 11 itself. As to the verifier 10, it can be a demander of the verification and authentication such as banks, electronic commerce, or a third party of providing the verification and authentication service such as a fair credit reporting unit. Therefore, a design of identity verification-authentication system disclosed in the present application can also select the verifier 10 to compare the first to-be-compared answer data and the first answer data and to generate the determination result, then the content of the proof request sent to the prover 11 only includes the first variant data, and the first answer data is kept in not sent out the verifier 10. Certainly, the verifier can process the demands of the identity verification-authentication submitted by multiple users including a second user 22 through the second prover 12 shown in FIG. 1B, the method is the same as the steps performed on the first prover 11. Therefore, for the convenience of description, only the first user 21 is taken as the example to explain the technical details below.

Figure 1D:
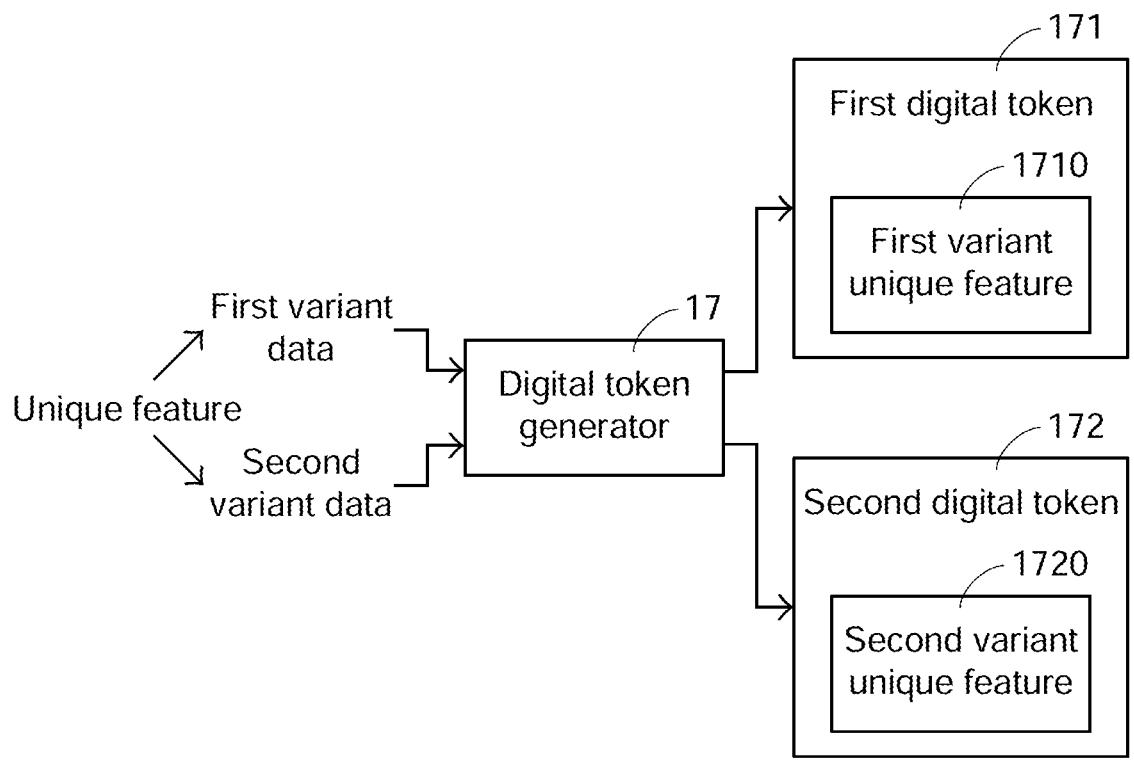
FIG. 1D is a functional block schematically illustrating a digital token generator in the present application.

From the above description of technology, it can be seen that the method and the system provided by the present application have the function that allows the user perform the identity verification-authentication at the remote end. Therefore, the method and the system are particularly suitable for the users to create avatars in the Internet or even Metaverse, and meet the demand of verifying and authenticating the avatars thereof, and the avatar will have highly close relation with a certain unique feature (such as a biometric feature) of the user. For example, the first variant data included in the first proof request is an important information required to generate the first answer data (especially, the variant unique feature), the first answer data can be generated by the first user 21 on the avatar producing stage utilizing the unique feature thereof and the first variant data, the first answer data is stored in an accessible database, and the unique feature cannot be reversely extrapolated according to the first answer data and the first variant data. Therefore, even if a data leak event occurs in the database or the database is a public ledger system (such as a blockchain), the unique feature of the first user 21 will not be known to a malicious intruder. In this way, the first user 21 does not worry to put the first answer data (the variant unique feature) generated on the avatar producing stage in the database which the verifier 10 can access. In addition to generate the first answer data on the avatar producing stage, multiple answer data can be generated and stored in the database together by utilizing the unique feature and multiple variant data different each other. Different variant unique features can be generated according to the same unique feature of the same user and the different variant data, thereby generating the different digital tokens. For example, please refer to FIG. 1D schematically illustrating a digital token generator 17, it can be seen that the digital token generator 17 can generate a first digital token 171 according to the unique feature and the first variant data, the first digital token 171 includes a first variant unique feature 1710; additionally, the digital token generator 17 can generate a second digital token 172 according to the unique feature and the second variant data, the second digital token 172 includes a second variant unique feature 1720. However, both the first digital token 171 and the second digital token 172 can be used to represent the user, thus, multiple digital tokens can be selected by the verifier 10 to produce the proof requests of different contents. The digital token generator 17 can be disposed in the first prover 10 or the second prover 12 shown in FIG. 1B, or can be set in any site where there is a need for the avatar production or the online identity registration.

The verifier 10 in the aforesaid identity verification and authentication system 1 can be a hardware device, a software program, or a combination of the two, the first user 21 can pass the verification of the verifier 10 by utilizing the unique feature of himself/herself and the processing between the first prover 11. For example, the first user 21 who is the customer of the bank wants to log into the bank account remotely, and the verifier 10 is responsible for a task of verifying "the first user 21 and the customer who originally registered the bank account are the same person". The aforesaid unique feature can be the secret that the user keeps with him/her and can take out repeatedly, for example, one of a combination of a personal identification number (PIN) in memory, a handwritten signature or symbol, a pass code pronounced by himself/herself, a special gesture or habitual body movement, and one or more biometric features. To take the biometric feature as an example, the first prover 11 can be an identity proof device having biometric feature extracting function, the device can be accessed by the first user 21. The biometric feature being the fingerprint is taken as an example for explanation below.

Figure 2A:
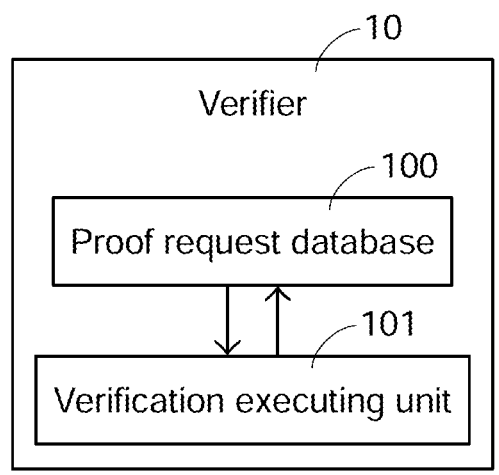
FIG. 2A is a functional block schematically illustrating a preferred embodiment for completing a verifier 10.
Figure 2B:
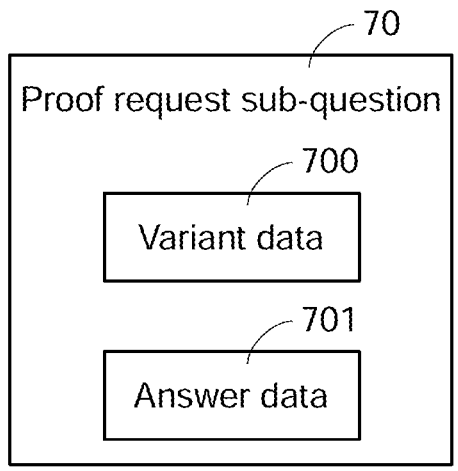
FIG. 2B is a diagram illustrating an example of a data block of proof request sub-questions provided by the present application.

Please refer to FIG. 2A, which is a functional block schematically illustrating a preferred embodiment for completing a verifier 10, which mainly includes a proof request database 100 and a verification executing unit 101. The proof request database has stored a plurality of proof request sub-questions, a content of the proof request sub-questions can be a data block shown in FIG. 2B. Each one of the proof request sub-questions can include the variant data 700 and the answer data 701 corresponding to a user, and the paired variant data 700 and answer data 701 can be obtained from the content of the digital token shown in FIG. 1D. To take the fingerprint as an example, the answer data 701 is a variant fingerprint data, and the variant data 700 is a set of variation control parameters for use of generating the variant fingerprint data. Details and examples of a method of forming the proof request sub-questions will be described later.

To take the first user 21 as the example again, if the first user 21 wants to log into the bank account, the first user 21 can remotely use the first prover 11 to initiate a verification request to the verifier 10, and the verification request includes a decentralized identity (DID), an identity number belonging to the first user, a mobile phone number or a username defined by the first user, etc., The verification executing unit 101 can generate a proof question set from the proof request database according to the identity code of the first user included in the verification request, and an answer set corresponding to the proof question set can certainly be obtained. For example, the proof question set can include one or more of the proof request sub-questions corresponding to the first user 21, and other proof request sub-questions not corresponding to the first user 21 can be mixed therein. The proof request sub-questions corresponding to the first user 21 includes the first variant data and the first answer data, wherein the first answer data is the variant fingerprint data corresponding to the first user 21, and the first variant data is the set of variation control parameters for use of generating the variant fingerprint data. Then, the verifier 10 sends the proof request to the first prover 11, and the proof request includes the proof question set. The determination result can be generated according to the comparison of the proof question set and the to-be-compared answer set generated corresponding to the proof question set, and then whether the identity verification-authentication of the first user 21 is successful can be determined according to the determination result being consistent with the answer set or not.

Figure 3A:
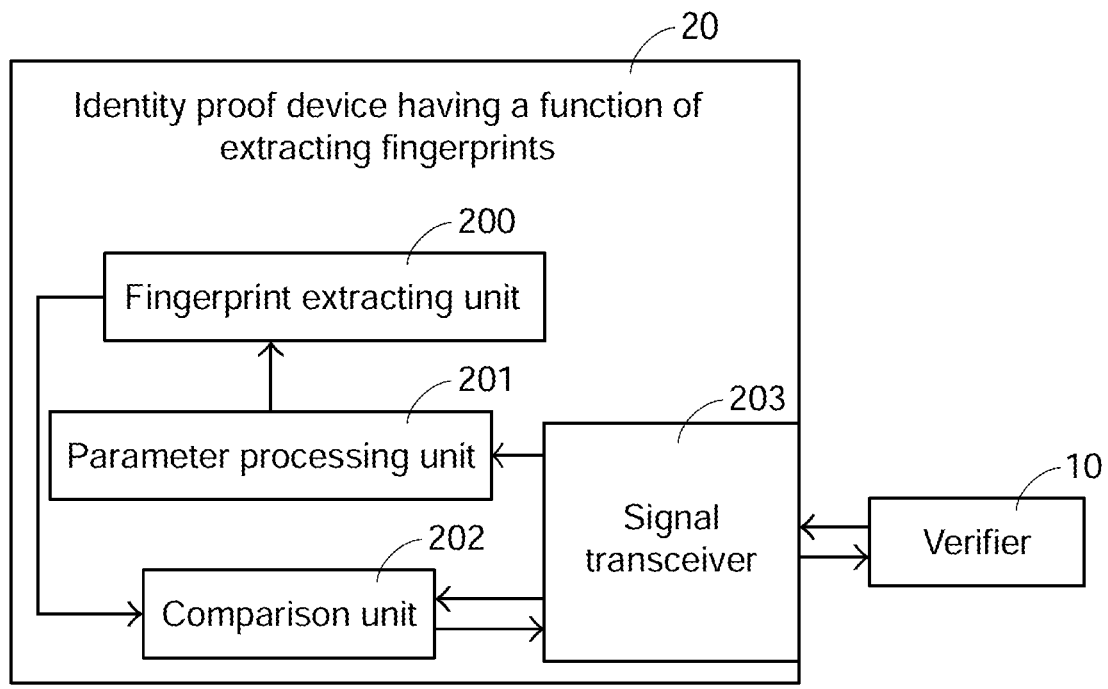
FIG. 3A is a functional block schematically illustrating a preferred embodiment of the first prover 11 completed by using fingerprints as an example.

As shown in FIG. 3A, which is a preferred embodiment of the first prover 11 completed by using fingerprints as an example, a functional block schematically illustrating the identity proof device 20 having a function of extracting fingerprint, which mainly includes a fingerprint extracting unit 200, a parameter processing unit 201, a comparison unit 202 and a signal transceiver 203, wherein the fingerprint extracting unit 200 is used for extracting single fingerprint or more fingerprints of the first user 21 or permutations and combinations of multiple fingerprints of joint account users (i.e. multiple people share this account). In order to reduce the amount of data, the extracted fingerprint can be converted and simplified into a smaller number of feature points group, and other unique features such as voiceprints, faces can be processed in this way. The fingerprint extracting unit 200 has a variety of fingerprint extraction and conversion rules, can switch them according to a content of the variation control parameter output by the parameter processing unit 201, and can generate a plurality of variant fingerprints of patterns different each other while the fingerprint pattern of the same finger is as a base. The signal transceiver 203 sends the first variant data (i.e. the set of variation control parameters for use of generating the variant fingerprint data in this example) included in the proof request sub-question in the proof question set in the proof request received thereby to the parameter processing unit 201, and sends the first answer data (i.e. the variant fingerprint data corresponding to the first user 21 in this example) included in the proof request sub-question in the proof question set in the proof request received thereby to the comparison unit 202. The parameter processing unit 201 outputs the set of variation control parameters to the fingerprint extracting unit 200 according to the first variant data; the fingerprint extracting unit 200 switches multiple fingerprint extraction and conversion rules to the fingerprint extraction and conversion rule corresponding to the variation control parameters to perform fingerprint extraction and conversion, finally generates and sends the first to-be-compared answer data including a variant fingerprint to the comparison unit 202; the comparison unit 202 compares the first to-be-compared answer data with the first answer data (the variant fingerprint data corresponding to the first user 21), then to determine whether the two are consistent, finally a determination result that is like an answer column of the true/false questions (which one or those sub-questions among the multiple sub-questions are the variant fingerprint of the first user 21) is obtained after each proof request sub-question that is like the true/false question was compared, and the determination result is sent to the verifier 10; the verifier 10 compares the determined result received with the answer set originally generated to determine whether the identity verification-authentication of the user is successful. For example, if the comparison is completely consistent or consistent rates of true/false respectively reach specific thresholds (e.g. a probability of a fingerprint that is not mine but is determined as mine should be lower than a specific threshold value, a probability of a fingerprint that is indeed mine but is determined as not mine should also be lower than another specific threshold value), then the first user will be allowed to log into the bank account, or specific services will be performed. Certainly, each proof request sub-question that is like true/false question set included in the proof question set can be given once and answered once, or it can be given in series and answered in steps, the method can be adjusted completely according to needs.

Moreover, if it is another embodiment that transfer the work of the comparison unit 202 to the verifier, then the verifier 10 can be used to perform the comparison of the first to-be-compared answer data and the first answer data, thus the proof request which the verifier 10 sends to the first prover 11 can only include the first variant data, and the first answer data can be selected to be kept in not sent out the verifier 10. Additionally, the fingerprint extracting unit 200 can be replaced by using other biometric feature extracting units, such as a handwritten signature unit, a voiceprint extracting unit, a palmprint extracting unit, a face image extracting unit, an iris extracting unit, a gait image extracting unit, a palm dynamic pressure extracting unit or a walking plantar pressure extracting unit, etc., The gait image extracting extracts and converts continuous images of the user's walking posture into a unique habitual action feature data related to the user, the palm dynamic pressure extracting unit refers to a pressing process sensing completed by pressing palmprint on a pressure sensing plane from fore palm to back palm (or reverse), then to obtain a set of pressure data that changes with time during the process. The walking plantar pressure extracting unit refers to a set of pressure data that changes with time and is sensed during a walking process completed by sole of feet walking on a pressure sensing plane. These pressure data have personal characteristics to be used as biometric features. Additionally, in order to avoid being deceived by screenshots of photos, functional units such as depth detection or body temperature detection can be added to the extracting unit.

The multiple proof request sub-questions corresponding to the multiple users stored in the proof request database 100 can be generated by a proof device utilized by each user. The proof request database 100 can be disposed in a cloud to provide multiple remote and different verification executing units being signal connection thereto and accessing the proof requestion set therein to generate the proof request needed. For example, when the first user 21 (or the second user 22) is registering the account in the bank or producing the avatar in the Metaverse, the first prover 11 (or the second prover 12) can be utilized to extract single or multiple fingerprints of the first user 21 (or the second user 22), to generate a plurality of variant fingerprints of patterns different each other with the fingerprint pattern of the same finger as the base according to the different variant control parameters, to compose the plurality of proof request sub-questions belonging to the first user 21 by pairing the variant fingerprint with the corresponding variation control parameter, and to send the proof request sub-questions to the proof request database 100 for storage, so as to complete purposes of producing the avatar and enriching a question bank. Additionally, when the user successfully performs the identity verification-authentication, the variant fingerprint required to be generated or the variant fingerprint more generated by utilizing different variant data can be made into new proof request sub-questions, and the verifier sends the new proof request sub-questions to the proof request database 100 to complete the purpose of enriching the question bank.

For further explanation, as shown in FIG. 4A, data types of the proof question set in the proof request can include a question set (abcDef) composed of a timestamp, a name sending a challenge (e.g. bank abc in the figure) and a sufficient number of the proof request sub-questions (abcDef1, abcDef2, abcDef3, . . . ). Each proof request sub-question can be taken from the proof request database 100, or generated by the challenger itself according to a data format (as shown in FIG. 4B) of the proof request sub-requestion. To take the fingerprint as the example, each proof request sub-question can include the variant fingerprint data corresponding to a certain user and the set of variation control parameters for use of generating the variant fingerprint data. As to the data format of the proof request sub-question, as shown in FIG. 4B, it includes the biometric feature, a garbler parameter and raw data. Therefore, when the verification executing unit 101 generates the proof question set corresponding to the first user 21, one or more of the proof request sub-questions corresponding to the first user can be selected, and the proof request sub-questions not corresponding to the first user are selected as other part; certainly, it also can be that no one of the proof request sub-questions corresponding to the first user is selected, and those selected in the proof question set all are the proof request sub-questions not corresponding the first user. In this way, the answer set corresponding to the proof question set is a bit string or a bit array. For example, the proof question set includes 16 sub-questions, wherein the 3rd and the 12th sub-questions are the proof requestion sub-questions corresponding to the first user, and the other proof request sub-questions correspond to other users. Therefore, the answer set corresponding to the proof question set is a 16-bit string "0010000000010000". In this way, the determination result sent from the identity proof device 20 having the function of extracting fingerprint is sent to the verifier 10, if the determination result and the answer set are consistent or the consistent rate thereof reaches a specific threshold, then the verifier determines that this time of the identity verification and authentication of the user is successful. As to the aforesaid example, the first user being the bank customer can successfully log into the bank account by utilizing the first prover 11 to pass the verification and authentication of the verifier 10.

Figure 3B:
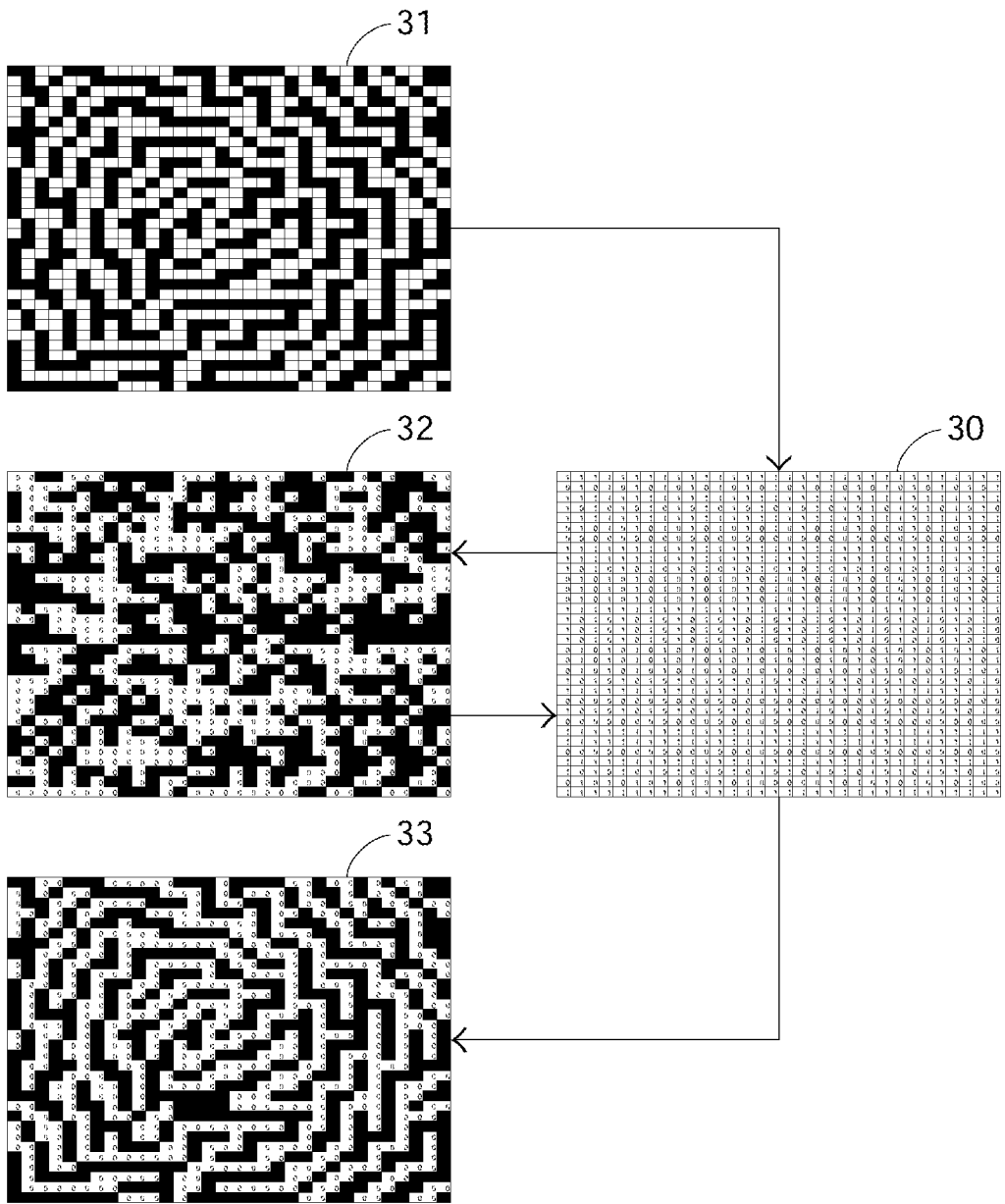
FIG. 3B is a functional block schematically illustrating multiple Exclusive OR table set at both a sending side and a receiving side to perform conversion.

Additionally, in order to prevent the answer set (the bit string or the bit array) corresponding to the proof question set from being eavesdropped, a transmission protocol can be added to change the content of the answer set, as a functional block shown in FIG. 3B, multiple Exclusive OR table are set at both the sending side and the receiving side (for example, the signal transceiver 203 and the verifier 10 in FIG. 3A), after an exclusive OR (XOR) operation is performed on the answer set 31 through a selected XOR table 30, an expression of the answer set 31 can be changed, then the signal transceiver 203 sends the answer set of changed expression 32 to the verifier 10, and the verifier 10 can perform the XOR operation on the answer set of changed expression 32 by utilizing the same XOR table 30 owned itself, to get back a restored answer set 33 of a content that is consistent with that of the answer set 31.

It is worth emphasizing again, the answer data, included in the proof request sub-questions stored in the proof request database 100, and the real data are not the same; for example, the pattern of the variant fingerprint data file corresponding to the user is obtained by the fingerprint extracting unit 200 scanning the finger of the user according to different variant data (the set of variation control parameters), so the patterns of variant fingerprint generated thereby and the real fingerprint are not the same. Therefore, the real fingerprint pattern will not be extracted, nor will it be stored in the proof request database 100 also be stored in the identity proof device having the function of extracting fingerprint 20 (i.e. the first prover 11), and thus the problem of the real fingerprint pattern being stolen can be prevented. The unique features of the user, in addition to the aforesaid fingerprint, can also be the handwritten signature, the gait, the face, the voiceprint, the iris, the palm dynamic pressure, the walking plantar pressure or the like biometric features of the user, similarly, on the time of extracting the features, the varied feature data is obtained by utilizing different variant data (for example, the set of variation control parameters) to perform conversion, the varied feature data or the digital token including the varied feature data is not the same as the real data.

The proof request database 100 can be implemented as a secure ledger database or a untemperable digital ledger in a form of a blockchain. The proof request sub-questions stored in the proof request database 100 can be uploaded one after another by the legitimate user devices (conditions of uploading will be explained later), with a number of uses increasing, each user will generate and store a huge number of sub-questions in the proof request database 100 at the same time, therefore, the number of questions or the amount of the digital tokens in the database will increase accordingly, thereby increasing a change degree of the question groups. The unique feature or secret of the user uploaded to the various types of open but untamperable digital ledger have been processed into various variations without repetition by the technology of the present application, additionally, the digital tokens, the contents of the proof request sub-questions and the transaction timestamps completed in the form of the blockchain cannot be maliciously tampered.

Figure 5A:
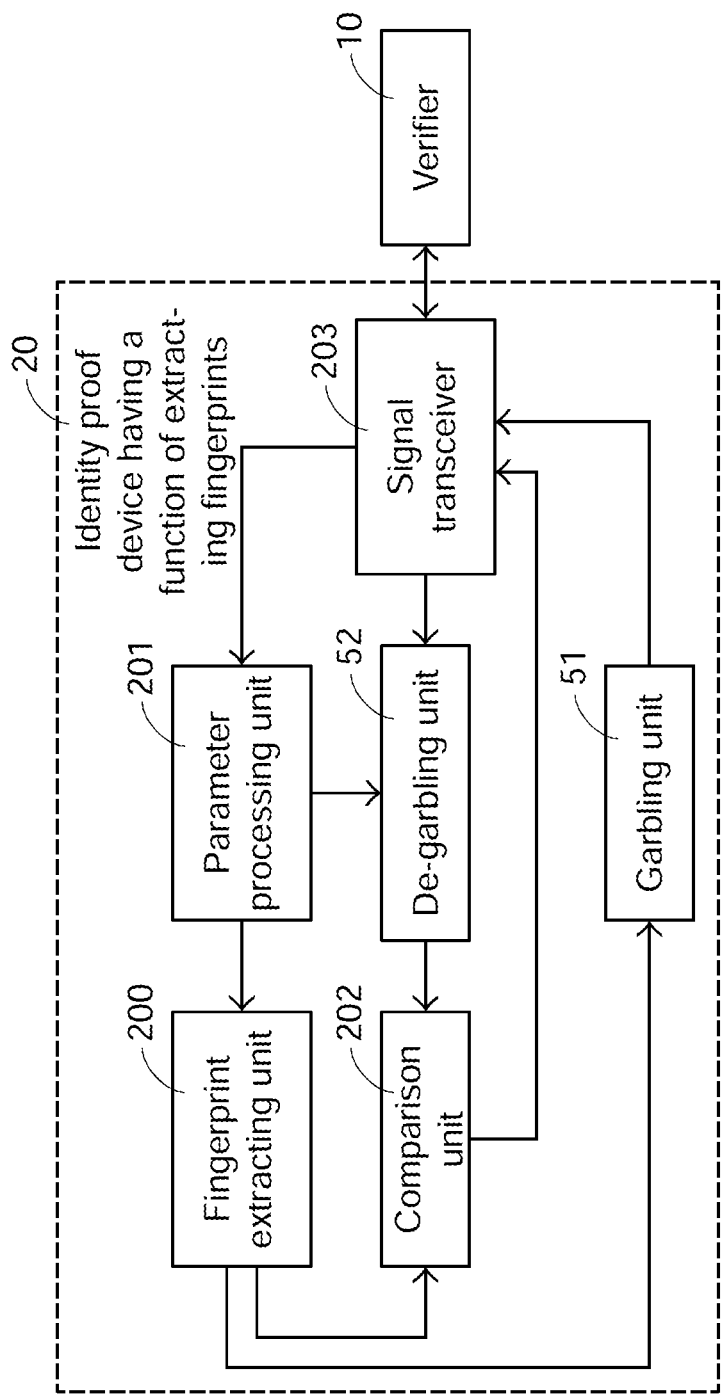
FIG. 5A is a functional block schematically illustrating a first preferred embodiment further developed according to the identity proof device 20 having a function of extracting fingerprint shown in FIG. 3A.

Please refer to FIG. 5A, which is a functional block schematically illustrating a first preferred embodiment further developed according to the identity proof device 20 having the function of extracting fingerprint shown in FIG. 3A. As shown in the figure, it is the preferred embodiment used to complete the first prover 11 for exclusive use of the first user 21. In addition to the fingerprint extracting unit 200, the parameter processing unit 201, the comparison unit 202 and the signal transceiver 203 originally included, the identity proof device 20 having a function of extracting fingerprint further includes a garbling unit 51 and a de-garbling unit 52. The fingerprint extracting unit 200 can be used for extracting single fingerprint or permutations and combinations of multiple fingerprints of the first user 21, and the fingerprint extracting unit 200 has the variety of fingerprint extraction and conversion rules, can switch them according to the content of the variation control parameter output by the parameter processing unit 201, and can generate the plurality of variant fingerprints of patterns different each other while the fingerprint pattern of the same finger is as the base. A garbling operation is performed to any original variant fingerprint data in the plurality of variant fingerprint by the garbling unit 51 according to a garbler parameter (can be generated by using the garbler), to generate a garbled original variant fingerprint data, and the signal transceiver 203 can send the garbled original variant fingerprint data to the proof request database 100 at a remote end for storage, to enrich numbers and types of the proof request sub-questions in the proof request database 100. A purpose of performing the garbling operation to the original variant fingerprint data is to prevent the original variant fingerprint data from being maliciously collected and interpreted. The garbling unit 51 can be simply implemented by using the XOR circuit as shown in FIG. 3B, certainly, other digital combinations or sequential circuits can also be used to complete the garbling unit 51.

Next, the following example is used to explain the verification and authentication process performed in this embodiment, the signal transceiver 203 receives the proof request from the verifier 10, the data format of each proof request sub-question in the proof request can be as shown in FIG. 4B, which includes the biometric features, the garbler parameters and the garbled variant biometric feature data (raw data). The set of variation control parameters (the biometric feature parameters) in the proof request sub-question for use of generating the original variant fingerprint data is sent to the parameter processing unit 201 by the signal transceiver 203. Additionally, The first answer data (the garbled variant fingerprint data corresponding to the first user) included in the proof request sub-question and the garbler parameter are sent to the de-garbling unit 52 first, the de-garbling unit 52 performs a de-garbling operation to the first answer data (the garbled variant fingerprint data corresponding to the first user) according to the garbler parameter, to get back the variant fingerprint data corresponding to the first user and to send it to the comparison unit 202. The parameter processing unit 201 outputs the set of variation control parameters (the biometric feature parameter) to the fingerprint extracting unit 200 according to the first variant data (for example, the fingerprint extracting unit and the capacitive sensing proposed by the inventor in U.S. Pat. No. 10,564,785 and patent family thereof, examples related to the variation control parameters can be various combinations of a parallel number of adjacent capacitive sensing electrodes, or various combinations of a parallel number of non-adjacent but closely spaced electrodes, or a mixture of the two, or different parallel combinations options for different sub-areas of the fingerprint), when the first user puts certain one or more fingers on the fingerprint extracting unit 200, the fingerprint extracting unit 200 utilizes the fingerprint extraction and conversion rule corresponding to the variation control parameter to extract the fingerprint, to generate and send the first to-be-compared answer data whose content is the variant fingerprint to the comparison unit 202. The comparison unit 202 compares the first to-be-compared answer data with the first answer data (the variant fingerprint data corresponding to the first user), and determines whether the two are consistent; after each sub-question is compared (which one or those sub-questions among the multiple sub-questions belong to the variant fingerprint of the first user), the determination result is obtained and sent to the verifier 10, and the verifier 10 can further determine whether the identity verification and authentication of the user is successful according to the received determination result.

Figure 5B:
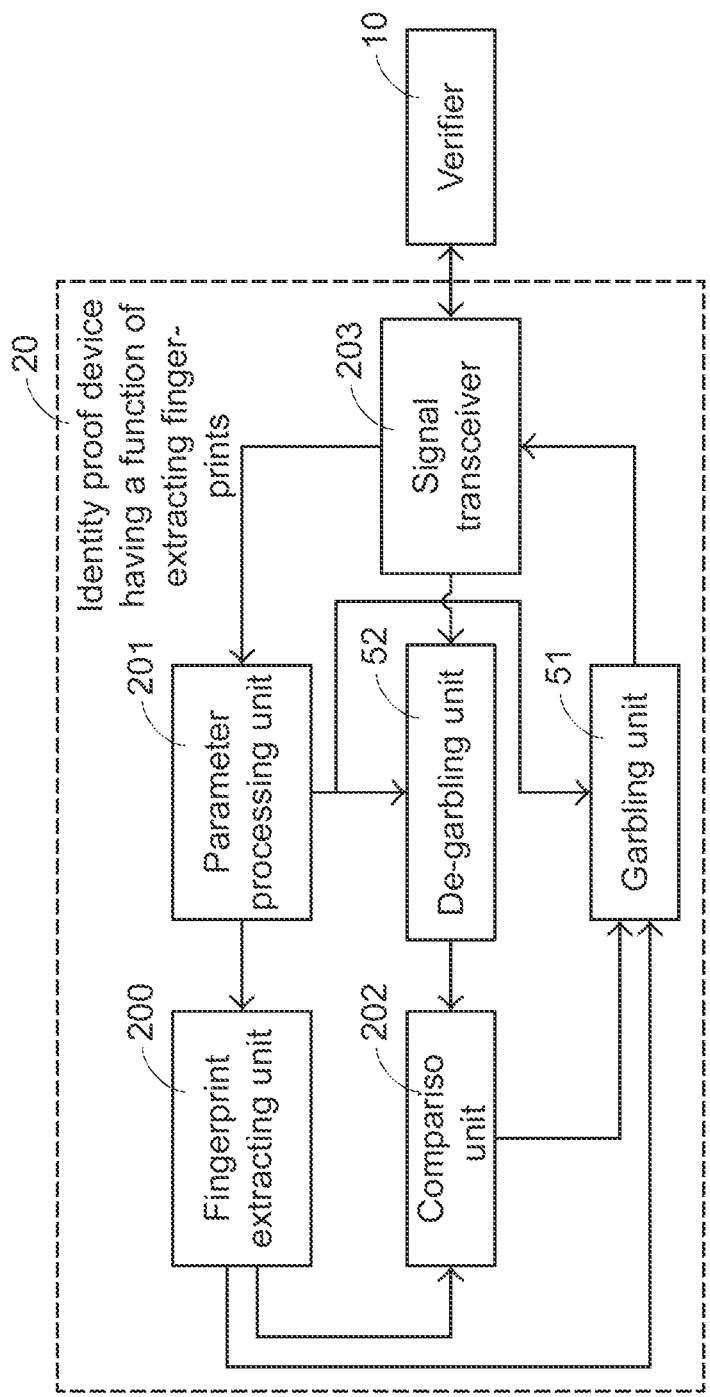
FIG. 5B is a functional block schematically illustrating a second preferred embodiment further developed according to the identity proof device 20 having a function of extracting fingerprint shown in FIG. 3A.

Please refer to FIG. 5B, which is a functional block schematically illustrating a second preferred embodiment further developed according to the identity proof device 20 having the function of extracting fingerprint shown in FIG. 3A, as shown in the figure, there are two differences between the second preferred embodiment for completing the first prover 11 and the first preferred embodiment, the first difference is that the data format of the proof request, as shown in FIG. 4C, further includes an anti-eavesdropping protocol parameter determined by the verifier 10; the second difference is that the determination result obtained by the comparison unit 202 is first passed through the garbling unit 51 to generate a garbled determination result, and the comparison unit 202 sends the garbled determination result to the verifier 10; the verifier 10 de-garbles the garbled determination result received according to anti-eavesdropping protocol parameter determined thereby, so as to further determine whether the identity verification and authentication of the user is successful.

Figure 5C:
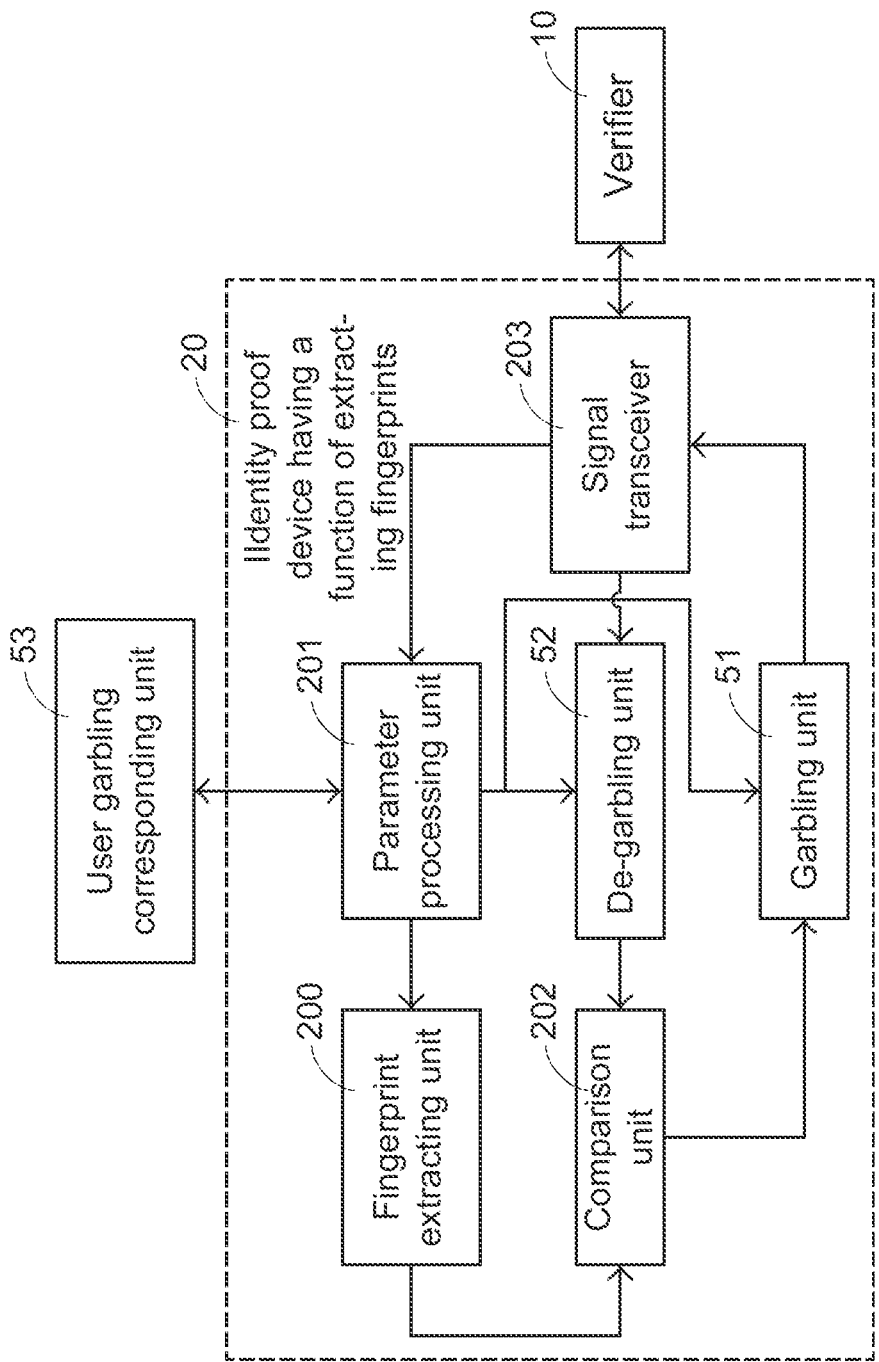
FIG. 5C is a functional block schematically illustrating a third preferred embodiment further developed according to the identity proof device 20 having a function of extracting fingerprint shown in FIG. 3A.

Please refer to FIG. 5C, which is a functional block schematically illustrating a third preferred embodiment further developed according to the identity proof device 20 having the function of extracting fingerprint shown in FIG. 3A, as shown in the figure, the difference between the third preferred embodiment for completing the first prover 11 and the first and the second embodiments is that the first provers 11 of the first and the second embodiments are not exclusive to a user, but can be shared by multiple users, and thus can be disposed in credit card readers of store payment system, mobile payment card readers, automatic teller machines (ATM),rental house access control or door locks of shared cars. Therefore, in addition to the original identity proof device 20 having the function of extracting fingerprint, a user garbling corresponding unit 53 exclusively belonging to the user is further disposed in the third preferred embodiment. The user garbling corresponding unit 53 of this embodiment is dedicated to the first user, for example, the user garbling corresponding unit 53 can be a near field communication (NFC) IC card, which has stored a garbler parameter table exclusively belonging to the first user, when the user garbling corresponding unit 53 approaches the parameter processing unit 201, the garbler parameter table can be read by the parameter processing unit 201. Similarly, the fingerprint extracting unit 200 has the variety of fingerprint extraction and conversion rules, can switch them according to the content of the variation control parameter output by the parameter processing unit 201, and can generate the plurality of variant fingerprints of patterns different each other while the fingerprint pattern of the same finger is as the base. After the garbling unit performs the garbling operation to any variant fingerprint data in the plurality of variant fingerprints according to the garbler parameter table read from the user garbling corresponding unit and a garbler parameter generated by a random number, the garbled variant fingerprint is generated. The garbled variant fingerprint data is sent to the proof request database 100 at the remote end through the signal transceiver 203, to enrich the numbers and types of the proof request sub-questions in the proof request database 100. This application scenario can be the card activating behavior after the user obtained the user garbling corresponding unit for the first time, and the user garbling corresponding unit 51 can also be provided with a PIN for a secondary verification. The purpose of performing the garbling operation to the variant fingerprint data is to prevent the variant fingerprint data from being maliciously collected and interpreted. The garbling unit 51 can be simply implemented by using the XOR circuit as shown in FIG. 3B, certainly, other digital combinations or sequential circuits can also be used to complete it.

Next, the following example is used to explain the verification and authentication process performed in this embodiment, the signal transceiver 203 receives the proof request from the verifier 10, the data format of each proof request sub-question in the proof request can be as shown in FIG. 4B, which includes a biometric feature parameter, the garbler parameters and the garbled variant fingerprint data (raw data). The set of variation control parameters (the biometric feature parameters) in the proof request sub-question for use of generating the original variant fingerprint data is sent to the parameter processing unit 201 by the signal transceiver 203. Additionally, The first answer data (the garbled variant fingerprint data corresponding to the first user) included in the proof request sub-question and the garbler parameter are sent to the de-garbling unit 52 first, the de-garbling unit 52 performs the de-garbling operation to the first answer data (the garbled variant fingerprint data corresponding to the first user) according to the garbler parameter and the garbler parameter table that is downloaded from the user garbling corresponding unit 52, to get back the variant fingerprint data corresponding to the first user and to send it to the comparison unit 202. The parameter processing unit 201 outputs the set of variation control parameters (the biometric feature parameter) to the fingerprint extracting unit 200 according to the first variant data, when the to-be-verified-authenticated user puts fingers on the fingerprint extracting unit 200, the fingerprint extracting unit 200 utilizes the fingerprint extraction and conversion rule corresponding to the variation control parameter to extract the fingerprint, to generate and send the first to-be-compared answer data whose content is the variant fingerprint to the comparison unit 202. The comparison unit 202 compares the first to-be-compared answer data with the first answer data (the variant fingerprint data corresponding to the first user), and determines whether the two are consistent; after each sub-question is compared (which one or those sub-questions among the multiple sub-questions belong to the variant fingerprint of the first user), the determination result is obtained and first passed through the garbling unit 51 to generate the garbled determination result, and the comparison unit 202 sends the garbled determination result to the verifier 10; the verifier 10 de-garbles the garbled determination result received according to anti-eavesdropping protocol parameter, so as to further determine whether the identity verification-authentication of the user is successful; that is, whether the to-be-verified-authenticated user is the first user.

Figure 6A:
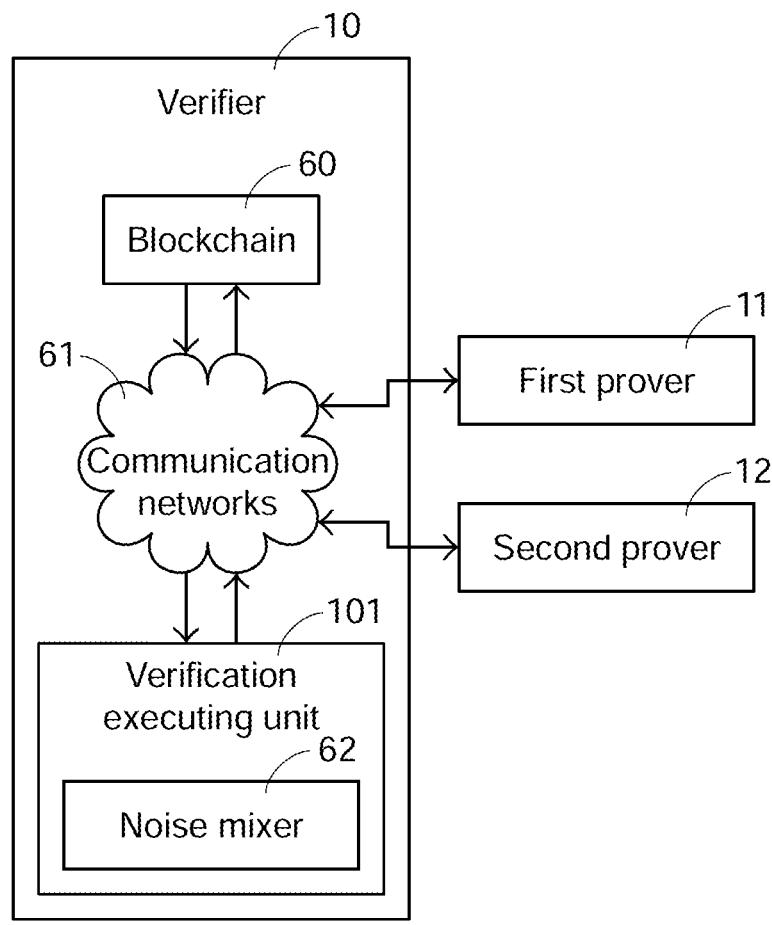
FIG. 6A is a functional block schematically illustrating a preferred embodiment developed by the present application for accomplishing the aforesaid verifier 10.

Please refer to FIG. 6A, which is a preferred embodiment developed by the present application for accomplishing the aforesaid verifier 10, wherein the proof request database 100 can be completed by the untamperable blockchain 60, the question bank of the proof request database 100 has stored the plurality of untamperable proof request sub-questions, and can be enriched by the proof request sub-questions that are generated and sent back by the multiple provers (the first prover 11, the second prover 12) at remote ends. For example, the prover can be the aforesaid identity proof device 20 having the function of extracting fingerprint, the proof request sub-questions sent back, as shown in FIG. 4B, includes the data packet of the biometric feature parameters, the garbler parameters and the garbled variant fingerprint data.

As for how to put the proof request sub-questions on the blockchain 60, it can be completed according to following steps of a method of an embodiment. Firstly, when the first user is producing the avatar, the first prover 11 is utilized to extract the fingerprint of the first user 21, and to generate the plurality of variant fingerprints of patterns different each other with the same fingerprint as the base according to the different variant control parameters, to compose the plurality (e.g. 256) of proof request sub-questions "["abcDeF1", "abcDeF2", "abcDeF3", . . . , "abcDeF256"]" belonging to the first user 21 by pairing the variant fingerprint with the corresponding variation control parameter, and then to send the proof request sub-questions to the blockchain 60 for storage; the blockchain 60 will automatically generate an ID "1234567890" for this transaction, and associate the ID "1234567890" with the identity of the first user 21 in the verifier 10. The ID "1234567890" will also be sent back to the first prover 10 belonging to the first user 10, and be recorded in the data block as shown in FIG. 4D, so as to complete the purposes of producing the avatar and enriching the question bank. The first four items in FIG. 4D are the data format of the blockchain, so they will be not described again. In a subsequent time of performing the identity verification and authentication process, the first user 21 can present the ID "1234567890" to the verifier 10, so that the verifier 10 can find the proof request sub-questions associated with the first user 21 in the blockchain 60 according to the ID "1234567890", to generate the proof request. If the identity verification and authentication process is passed, then the first user 21 is allowed to log into the account associated with the ID "1234567890".

In the technical means of the present application, an operation of expanding the number of the proof request sub-questions can be performed during another identity verification and authentication process in the future. To take the first user 21 as the example again, when the blockchain 60 has stored the ID "1234567890" and the plurality of proof request sub-questions associated with the first user 21, and the first user 21 presents the ID and the fingerprint on the first prover 11 for scanning to perform the next identity verification and authentication process, the first prover 11 can generate the proof request sub-questions again according to the plurality of variant fingerprints whose patterns are different each other and generated according to the different variation control parameters while the fingerprint scanned at this time is as the base. When specific conditions are met, the variant fingerprint and the corresponding variation control parameter are paired to compose the plurality of proof request sub-questions belonging to the first user 21, and then the plurality of proof request sub-questions belonging to the first user 21 is sent to the blockchain 60 for storage. The specific conditions can be that the identity verification and authentication process is passed; or that not only the identity verification and authentication process is passed, and the answers in the process are completely consistent; or even that the identity verification and authentication process is passed, the answers in the process are completely consistent, and a transaction amount is greater than a preset number. This operation of adding the plurality of new proof request sub-questions on the blockchain 60 will generate a new ID "0987654321" and the new ID will be recorded in the transaction digital ledger (it can also be the blockchain) established by the verifier 10.

In addition to the original biometric features, the new ID can further add new biometric feature as verification factors (for example, the first user 21 can select another fingerprint or the face through an annotation function of the first prover 11, and record an association between the newly generated variation control parameter and the annotation on the first prover 11, the annotation on the first prover 11 can correctly remind the first user 21 to provide the required biometric feature on the next time of processing the variation control parameters in the proof request sub-questions). By analyzing the above transaction digital ledger, it can be known that the new ID "0987654321" is newly added when the original ID "1234567890" performed and passed the identity verification and authentication, so that the new ID "0987654321" and the original ID "1234567890" have an association of belonging to the same user, and the method of expanding the proof request database is also achieved. Moreover, various combinations of fingerprints, numbers and sequences of different fingers of the user, and added with the unique feature of voiceprint or face pattern of the user can be a part of the verification factors to form different combinations. The different combinations can represent different service behaviors or user opinions, and then can activate different smart contracts on the blockchain. Therefore, specific combinations of the verification factors can activate the account into an anti-theft-account (having a withdrawal limit) or into a transfer behavior with high access authority. To add the voiceprint or face pattern of the user can further verify whether the user is awake or whether the user's will is coerced.

Moreover, if the first prover 11 does not belong to the first user, but is the example as shown in FIG. 5C, the user garbling corresponding unit 53 is used to store the garbler parameter table exclusively belonging to the first user, the identity code of the ID "1234567890" and the association of the variation control parameter and the annotation generated by the aforesaid method can be completed on the stage of producing the avatar and the subsequent stage of expanding the number of sub-questions of the proof request database. The identity code of the ID "1234567890" and the association of the variation control parameter and the annotation can be stored in the user garbling corresponding unit 53, other details are roughly the same as the aforesaid technical means, and will not be described again.

Please refer to FIG. 4E again, which is the data format, used in another embodiment, of the proof request sub-question uploaded on the blockchain, wherein the first four items are the data format that general blockchains have, so they will be not described again. The fifth item dezeta "1234567890" is used to represent an identification code of the proof request sub-questions of the first user 21. The sixth item id "did:zeta:sov:WRfXPg8dantKVubE3HX8pw" represents a decentralized identity identifier (DID) of the first user 21, which mainly is the DID "did:sov: WRfXPg8dantKVubE3HX8pw" generated by a decentralized blockchain and the annotation completed with the method provided by the system of the present application, so that the DID code "did:zeta:sov: WRfXPg8dantKVubE3HX8pw" which is added with the word "zeta" is generated. In details, after the first user 21 uploaded the public key in the public-private key pair to the decentralized blockchain (not shown), the DID is assigned to the first user 21 and obtained thereby. If the decentralized blockchain is established by Sovrin Foundation (SF), a format of the DID obtained is "did:sov: WRfXPg8dantKVubE3HX8pw". Then, the identity verification and authentication system of the present application (which can be referred as Dezeta) continues to use this DID to obtain the DID code "did:zeta:sov: WRfXPg8dantKVubE3HX8pw" which is added with the word "zeta". As to the seventh item of public key field "publicKey":"H3C2AVvLMv6qmMNam3uVAjZp fkcJCwDwnZn6z3wXmqPV" as shown in FIG. 4E, it is the public key in the public-private key pair. The private key in the public-private key pair can be stored in the user device of the first user 21, such as the first prover 11 or the user garbling corresponding unit 53.

In this example, when the first user is producing the avatar, the first prover 11 is utilized to extract the fingerprint of the first user 21, and to generate the plurality of variant fingerprints of patterns different each other with the same fingerprint as the base according to the different variant control parameters, to compose the plurality (e.g. 256) of proof request sub-questions belonging to the first user 21 by pairing the variant fingerprint with the corresponding variation control parameter, then the private key in the user device (for example, the first prover 11 or the user garbling corresponding unit 53 in the present application) which the first user owns to is used to encrypt the plurality of proof request sub-questions to form the encrypted proof request sub-questions "abcDeF": ["abcDeF1", "abcDeF2", "abcDeF3", . . . , "abcDeF256"], then the encrypted proof request sub-questions is composed into the data format as shown in FIG. 4E, and is sent to the blockchain 60 for storage. For this avatar producing process, the blockchain 60 will DID continue use the existing "did:zeta:sov: WRfXPg8dantKVubE3HX8pw", to complete the purposes of registration and enriching the question bank.

In a subsequent time of performing the identity verification and authentication process, the first user 21 can present his/her identity code (i.e. the aforesaid DID "did:zeta:sov: WRfXPg8dantKVubE3HX8pw") to the verifier 10 by his/her user device (for example, the first prover 11 or the user garbling corresponding unit 53 in the present application), so that the verifier 10 can go to the blockchain 60 to find the public key "publicKey": "H3C2AVvLMv6qmMNam3uVAjZpfkcJCwD wnZn6z3wXmqPV" and the data block (as shown in FIG. 4E) including the plurality of proof request sub-questions, then uses the public key "publicKey": "H3C2AVvLMv6qmMNam3uVAjZpfkcJCwDwn Zn6z3wXmqPV" to decrypt the encrypted proof request sub-questions, then restores and composes the proof request sub-questions into the proof request. The first user 21 will reply the to-be-compared answer data or determination result generated by the proof request by utilizing his/her user device, encrypt the reply with the private key, and send the encrypted reply to the verifier 10, so that the verifier 10 can use the public key for double confirmation. If the verifier 10 identifies that the first user 21 can pass the identity verification and authentication process, then it allows the first user 21 log into the account associated with "did:zeta:sov: WRfXPg8dantKVubE3HX8pw". Additionally, in this embodiment, because of the public and private key encryption system, the blockchain 60 can be replaced by using a general database, the proof request sub-questions is encrypted with the private key in this embodiment, to establish a link between the unique biometric feature (e.g. the fingerprints) and the public and private key pair, so that the proof request database generated has the effect of a digital signature. It can be ensured that the proof request sub-questions encrypted with the private key in this embodiment will not be maliciously tampered; therefore, it is not necessary to use the decentralized technology in the technical architecture to ensure that the data is not tampered, so there is no need to use the blockchain to save. Additionally, the present application can allow the unique biometric features (e.g. the fingerprints) link to different digital signatures, for example, the user can respectively encrypt multiple proof request sub-questions (i.e. perform the digital signature to the proof request sub-questions) by utilizing multiple private keys in different sets of the public and private key pairs generated by different or the same device which the user owns. In this way, in certain application, the verifier can raise a challenge to the user of the prover with the proof request which are composed by the proof request sub-questions, which are provided by the same user and stored in the same or different databases and originally encrypted with multiple different private keys, decrypted by utilizing the public key that the user discloses. When the user of the prover can reply the answer of high accuracy or even the completely correct answer, the verifier can identify that the multiple different private keys all belong to the same user. Since the digital signatures (such as the natural person certificates) issued by the government have higher credibility, the aforesaid technology can be used to perform the identity verification to the different digital signatures, then to establish the association of the different public and private key pairs owned by the same user, so as to strengthen the credibility of non-government issued digital signatures.

Moreover, since the present application can complete the link of the natural person and the DID by the link of the biometric features (such as the fingerprints) and the public and private key pairs, to apply this example to a non-fungible token (NFT) that is very popular now can further achieve the association of the natural person and the NFT, and be closer to a reality of allowing the natural persons own digital assets. Additionally, the question bank of new proof request sub-questions are generated by the user in the stage of producing the avatar and after each important transaction, such the untamperable records can be deemed as respective NFTs belonging to the different users. The NFT of the first user and the NFT of the second user are not the same, but it can be distinguished that those NFTs belong to the first user and those NFTs do not belong to the first user by the technology of the present application. One NFT is a proof that represents the user authorizes this important transaction, participates in this important activity, or actively checks in to express concern about this matter, even if the proof request sub-question bank (an NFT group) generated by different devices of the same user can be linked to the only electronic fingerprint of the device, the NFT, or an explicit QR-code, then it can be considered as the user's personal credit rating record, personal preference record, or even record of the biometric feature that changes over time. These records can be pointed to the same user across devices, and can be used as important references in other services of health insurance, financial credit, or even a consensus mechanism on the blockchain. The aforesaid NFT group can be stored in a cryptocurrency wallet and linked to one avatar of the user. The same user can hold multiple cryptocurrency accounts linked to his/her different avatars, and use them differently in different application scenarios.

Additionally, please refer to FIG. 4F, which is the data format, used in a further embodiment, of the proof request sub-question uploaded on the blockchain, the difference from FIG. 4E is that the public key field in the proof request sub-question is removed in FIG. 4F, because the DID "did:sov:WRfXPg8dantKVubE3HX8pw" is assigned and obtained after the first user 21 uploaded the public key in the public-private key pair to the decentralized blockchain (not shown), the public key can be found in the decentralized identity blockchain (not shown) according to the DID "did:sov:WRfXPg8dantKVubE3HX8pw", the public key does not have to be written in the proof request sub-questions. In a subsequent time of performing the identity verification and authentication process, the first user 21 can present his/her identity code (i.e. the DID "did:zeta:sov:WRfXPg8dantKVubE3HX8pw" annotated by adding "zeta") to the verifier 10 by his/her user device (for example, the first prover 11 or the user garbling corresponding unit 53 in the present application), so that the verifier 10 can go to the decentralized identity blockchain (not shown) and the blockchain 60 to respectively find the public key "publicKey":"H3C2AVvLMv6qmMNam3uVAj ZpfkcJCwDwnZn6z3wXmqPV" and the data block (as shown in FIG. 4F) including the plurality of proof request sub-questions, then uses the public key "publicKey":"H3C2AVvLMv6qmMNam3uVAjZpfkcJCwDwnZn 6z3wXmqPV" to decrypt the encrypted proof request sub-questions, then restores and composes the proof request sub-questions into the proof request. The first user 21 will reply the to-be-compared answer data or determination result generated by the proof request by utilizing his/her user device, encrypt the reply with the private key, and send the encrypted reply to the verifier 10, so that the verifier 10 can use the public key for double confirmation. If the verifier 10 identifies that the first user 21 can pass the identity verification and authentication process, then it allows the first user 21 log into the account associated with "did:zeta:sov:WRfXPg8dantKVubE3HX8pw". In this embodiment, because the encrypted proof request sub-questions is ensured not to be tampered through the public and private key encryption system, the blockchain 60 can be replaced by using a general database.

The verification executing unit 101 in FIG. 6A can connect to the blockchain 60 (or the proof request database 100) at the remote end through communication networks (Internet or a wide area network), to take out the required proof request sub-questions (as shown in FIG. 4E and FIG. 4F) from the blockchain 60 (or the proof request database 100), and finally to produce the proof request question set (as shown in FIG. 4A and FIG. 4C). In the producing process, the verification executing unit 101 can utilize a noise mixer 62 included therein, which is used to perform a sub-region partition to the answer data (for example, partitioned into 16 sub-regions) in the proof request sub-question, and to select certain sub-regions for noise mixing, so as to increase difficulty of comparing the first answer data.

Figure 6B:
FIG. 6B is a diagram schematically illustrating a variant fingerprint data and a variant fingerprint data added with noise in the present application.

For example, as shown in FIG. 6B, a fingerprint 620 in left of the figure is a diagram schematically illustrating a variant fingerprint data, after the noise mixer processed, a fingerprint 621 in right of the figure is formed, the fingerprint 621 includes a plurality of sub-regions added with noise, for example, a first sub-region 6211 that modulates a signal intensity of the image, a second sub-region 6212 that is replaced with data from other sub-regions, and a third sub-region 6213 that adds scratches to the image. In this way, even if the proof question set is intercepted by the malicious attacker, it is very difficult to reversely extrapolate the variant fingerprint data from the proof request sub-question added with noise. However, the mixed noise does not destroy main feature of the fingerprint, the multiple provers (the first prover 11, the second prover 12) at the remote ends can still successfully identify the proof request sub-questions which belong to the fingerprint of the user.

Moreover, if a more stringent proof is needed to complete a more significant transaction, then the multiple provers (the first prover 11, the second prover 12) may together send a answer of "the noise added regions pointed out" to the verifier 10 for further verification and authentication. Moreover, after the verification executing unit 101 selects certain sub-regions for the noise mixing, the fingerprint 621 formed is partitioned into 16 sub-regions as shown in FIG. 7A, which includes the sub-regions not added with noise (marked as O) and the sub-regions added with noise (marked as X). The provers (the first prover 11 and the second prover 12) can clearly point out "the regions added with noise" and the method of adding noise (scratched, replacement, etc.), therefore, an answer array (in which the sub-regions not added with noise are marked as O, and the sub-regions added with noise are marked as X) as shown in FIG. 7B can be obtained after compared, and then the answer array is together sent to the verifier 10 for further verification. Additionally, the sub-regions added with noise can be further marked as different values according to the method of adding noise, for example, bit values of 01, 10, 11, etc., and then the answer array is together sent to the verifier 10 for further verification. After the verifier 10 compared all the answers and verified that they are correct, a strong verification is completed, and the high-amount transaction can be completed.

Figures 8A, 8B:
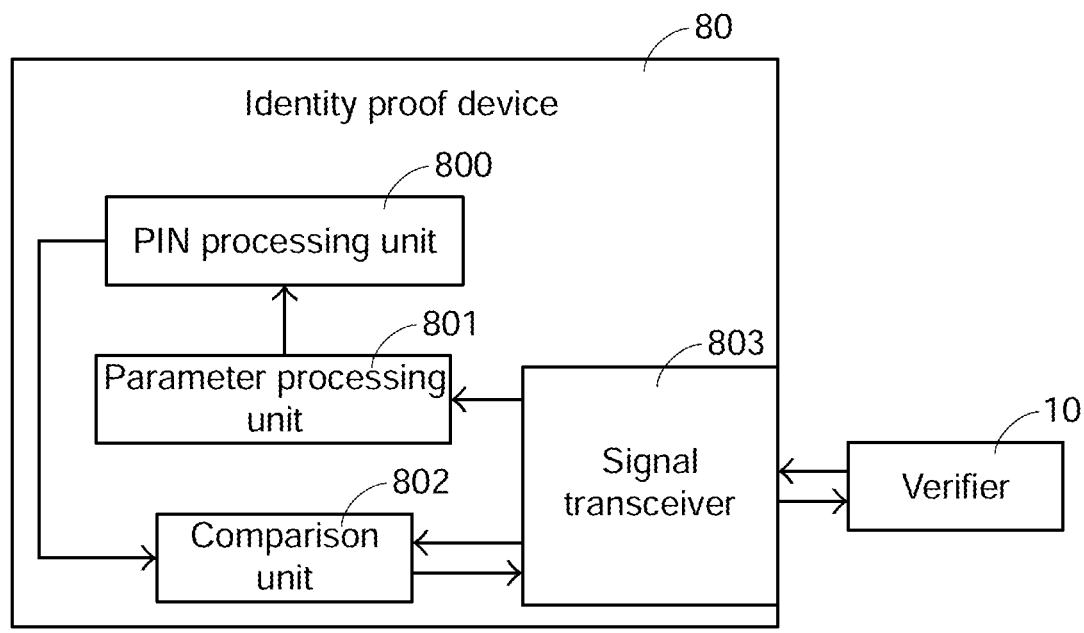
FIG. 8A is a functional block schematically illustrating a preferred embodiment of the first prover 11, completed by using a personal identification number (PIN) as an example, which is an identity proof device 80 with PIN input function.
FIG. 8B is a diagram schematically illustrating an example of a data format of the proof request sub-question related to PIN in the present application.

Please refer to FIG. 8A, which is a functional block schematically illustrating a preferred embodiment of the first prover 11, completed by using a personal identification number (PIN) as an example, which is an identity proof device 80 with PIN input function. In addition to the biometric feature of the first user, the unique feature recited in the present application can also be the PIN predetermined by the first user. The identity proof device 80 in this embodiment mainly includes a PIN processing unit 800, a parameter processing unit 801, a comparison unit 802 and a signal transceiver 803. The PIN processing unit 800 is used to receive a first PIN (e.g. 4-6 numbers), has a variety of conversion rules, can switch the conversion rules according to a content of the control parameters output by the parameter processing unit 801, and generates a plurality of variant digital code data different each other by utilizing the variety of conversion rules while the first PIN is as a base. The signal transceiver 803 sends the first variant data (the control parameter for use of generating the variant digital code data) included in the sub-question in the proof request received to the parameter processing unit 801, and sends the first answer data (the variant digital code data corresponding to the first user) included in the proof request sub-question in the proof request received to the comparison unit 802. The parameter processing unit 801 outputs the set of control parameters to the PIN processing unit 800 according to the first variant data; the PIN processing unit 200 switches multiple PIN processing and conversion rules to the PIN processing and conversion rule corresponding to the variation control parameters to process the PIN, finally generates and sends the first to-be-compared answer data including a variant digital code data to the comparison unit 802; the comparison unit 802 compares the first to-be-compared answer data with the first answer data (the variant digital code data corresponding to the first user), then to determine whether the two are consistent, after each sub-question is compared (which one or those sub-questions among the multiple sub-questions is/are the variant digital code data of the first user), the determination result is obtained and sent to the verifier 10, and the verifier 10 can further determine whether the identity verification and authentication of the user is successful according to the received determination result.

A data format example of the proof request sub-question related in this embodiment is as shown in FIG. 8B, which includes the PIN conversion rules and the variant digital code data (raw data). The PIN conversion rules can be completed by utilizing the electronic fingerprint generated by the PUF security technology as a seed required by a random number generator and by utilizing the a cyclic redundancy check (CRC) anti-noise coding method. The CRC anti-noise coding method is mainly used to detect or check errors that may occur during data transmission, and can be used to deal with errors deliberated added by the noise mixer 62 in the verifier 10 in the present application, so as to achieve the correct determination.

Figure 8C:
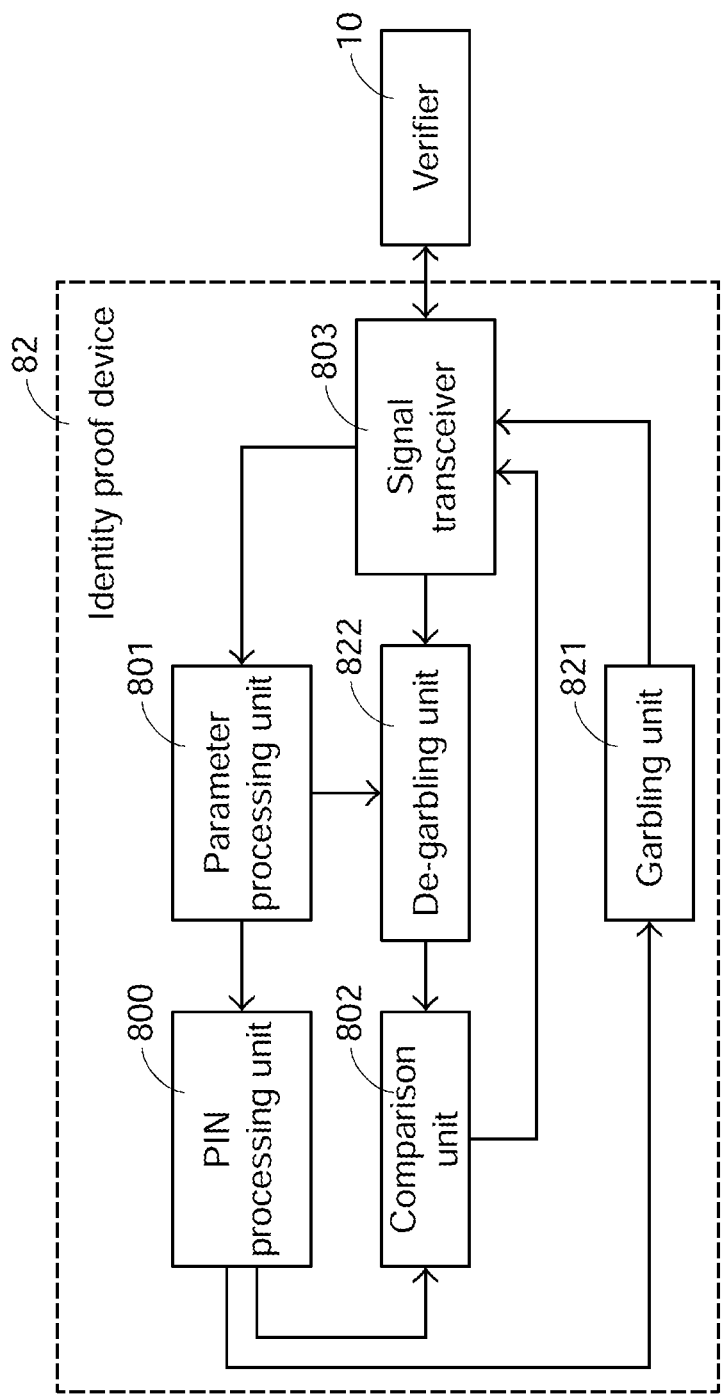
FIG. 8C is a functional block schematically illustrating another preferred embodiment of the first prover 11, completed by using the personal identification number (PIN) as an example, which is the identity proof device 80 with PIN input function.

Please refer to FIG. 8C, which is a functional block schematically illustrating another preferred embodiment of the first prover 11. The identity proof device 82 in this embodiment still uses the PIN predetermined by the first user as the unique feature. The difference from the previous embodiment is that the identity proof device 82 further include a garbling unit 821 and a de-garbling unit 823 in addition to the PIN processing unit 800, the parameter processing unit 801, the comparison unit 802 and the signal transceiver 803. The functions and effects of the PIN processing unit 800, the parameter processing unit 801, the comparison unit 802 and the signal transceiver 803 are roughly the same as those in FIG. 8A, so they will be not described again. In the stage of producing the avatar, the garbling operation is performed to the plurality of variant digital code data, which are generated by the PIN processing unit 800 based on the same PIN, by the garbling unit 821 according to a garbler parameter (can be generated by using the garbler), to generate a plurality of garbled variant digital code data, and the signal transceiver 803 can send the garbled variant digital code data to the proof request database 100 in the verifier 10 at the remote end for storage, to enrich numbers and types of the proof request sub-questions in the proof request database 100. A purpose of performing the garbling operation to the variant digital code data is to prevent the variant digital code data from being maliciously collected and interpreted. The garbling unit 821 can be simply implemented by using the XOR circuit as shown in FIG. 3B, certainly, other digital combinations or sequential circuits can also be used to complete the garbling unit 821.

Next, the following example is used to explain the verification and authentication process performed in this embodiment, the signal transceiver 803 receives the proof request from the verifier 10, the data format of each proof request sub-question in the proof request can be as shown in FIG. 8D, which includes the PIN, the garbler parameters and the variant digital code data (raw data). The set of PIN conversion rules in the proof request sub-question for use of generating the variant digital code data is sent to the parameter processing unit 801 by the signal transceiver 803. Additionally, The first answer data (the garbled variant digital code data corresponding to the first user) included in the proof request sub-question and the garbler parameter are sent to the de-garbling unit 822 first, the de-garbling unit 822 performs the de-garbling operation to the first answer data (the garbled variant digital code data corresponding to the first user) according to the garbler parameter, to get back the variant digital code data corresponding to the first user and to send it to the comparison unit 802. The parameter processing unit 801 outputs the set of variation control parameters (the PIN conversion rules) to the PIN processing unit 800 according to the first variant data, when the first user inputs his/her PIN to the PIN processing unit 800, the PIN processing unit 200 utilizes the PIN conversion rule corresponding to the variation control parameter to generate and send the first to-be-compared answer data whose content is the variant digital code data to the comparison unit 802. The comparison unit 802 compares the first to-be-compared answer data with the first answer data (the variant digital code data corresponding to the first user), and determines whether the two are consistent; after each sub-question is compared (which one or those sub-questions among the multiple sub-questions are the variant digital code data transformed from the PIN belonging to the first user), the determination result is obtained and sent to the verifier 10, and the verifier 10 can further determine whether the identity verification and authentication of the user is successful according to the received determination result.

Figure 8E:
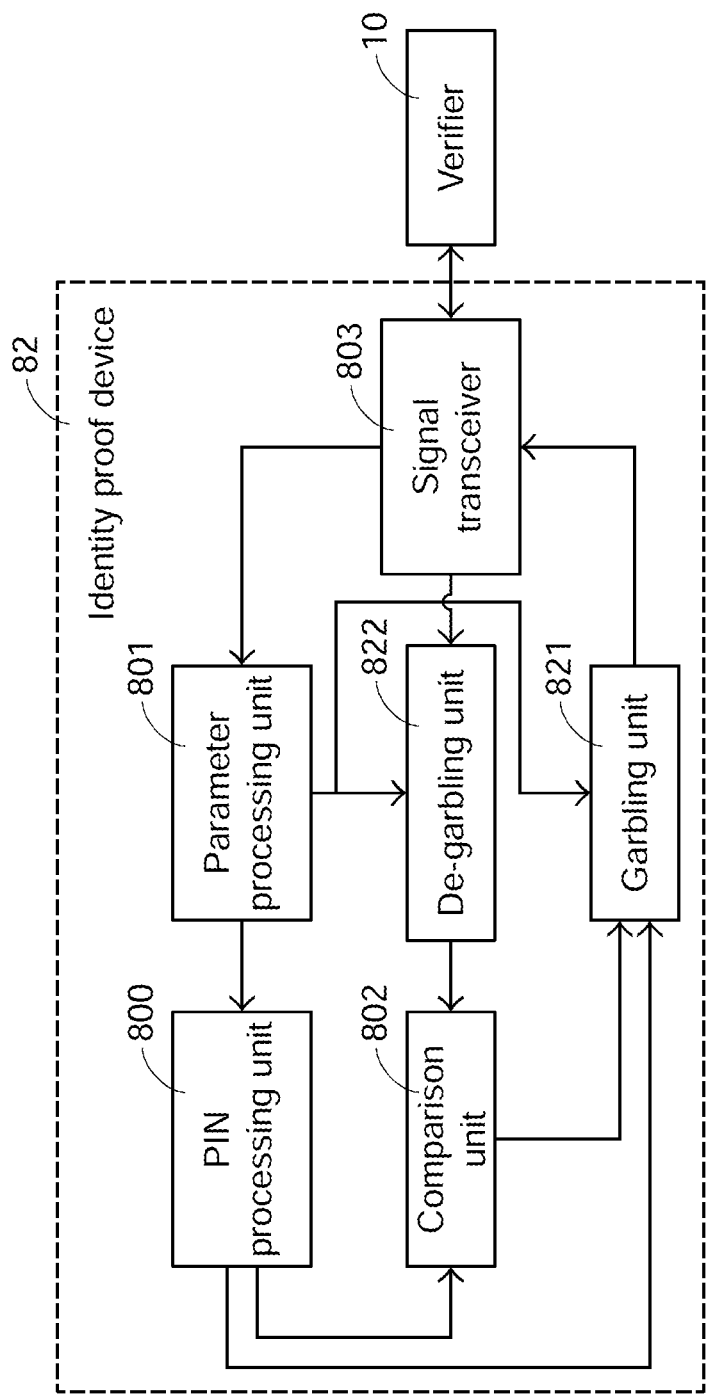
FIG. 8E is a functional block schematically illustrating a further preferred embodiment of the first prover 11, completed by using the personal identification number (PIN) as an example, which is the identity proof device 80 with PIN input function.

Please refer to FIG. 8E, which is a functional block schematically illustrating a further preferred embodiment of the first prover 11, a functional design thereof is similar to those in FIG. 5B, a difference is that the fingerprint extracting unit 200 is replaced with the PIN processing unit 800. The data format of the proof request used thereby is as shown in FIG. 4C, further includes an anti-eavesdropping protocol parameter determined by the verifier 10, the determination result (which one or those sub-questions among the multiple sub-questions are the variant digital code data transformed from the PIN of the first user) obtained by the comparison unit 802 is first passed through the garbling unit 821 to generate a garbled determination result, and the comparison unit 802 sends the garbled determination result to the verifier 10; the verifier 10 de-garbles the garbled determination result received according to the anti-eavesdropping protocol parameter determined thereby, so as to further determine whether the identity verification-authentication of the user is successful.

Figure 8F:
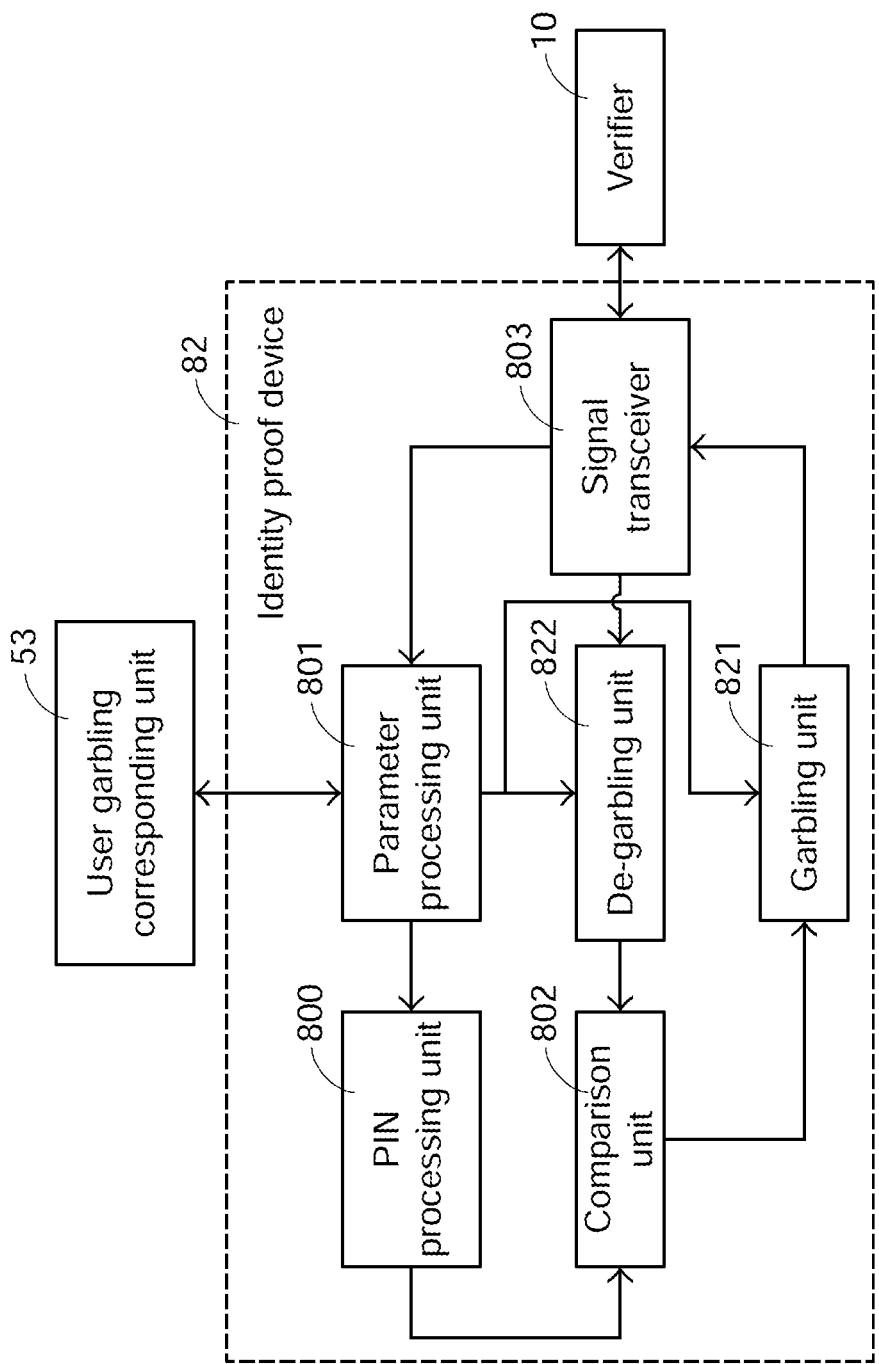
FIG. 8F is a functional block schematically illustrating a further preferred embodiment of the first prover 11, completed by using the personal identification number (PIN) as an example, which is the identity proof device 80 with PIN input function.

As shown in FIG. 8F, which is a functional block schematically illustrating a further preferred embodiment of the first prover 11, a functional design thereof is similar to those in FIG. 5C, differences are that the fingerprint extracting unit 200 is replaced with the PIN processing unit 800 and the user garbling corresponding unit 83 is added as the user device owned by the first user 21, the user garbling corresponding unit 53 can be the NFC IC card, which has stored the garbler parameter table exclusively belonging to the first user, when the user garbling corresponding unit 53 approaches the parameter processing unit 801, the garbler parameter table can be read by the parameter processing unit 801. The data format of the proof request used thereby is as shown in FIG. 8D, includes the PIN conversion rules, the garbler parameters and the variant digital code data (raw data). The set of control parameters (the PIN conversion rules) in the proof request sub-question for use of generating the variant digital code data is sent to the parameter processing unit 801 by the signal transceiver 803. The first answer data (the garbled variant digital code data corresponding to the first user) included in the sub-question and the garbler parameter are sent to the de-garbling unit 822 first, the de-garbling unit 822 performs the de-garbling operation to the first answer data (the garbled variant fingerprint data corresponding to the first user) according to the garbler parameter and the garbler parameter table that is downloaded from the user garbling corresponding unit 82, to get back the variant digital code data corresponding to the first user and to send it to the comparison unit 802. The parameter processing unit 801 outputs the set of variation control parameters (the PIN conversion rules) to the PIN processing unit 800 according to the first variant data, when the to-be-verified-authenticated user inputs the PIN to the PIN processing unit 800, the PIN processing unit 200 utilizes the PIN conversion rule corresponding to the control parameter to convert the PIN, to generate and send the first to-be-compared answer data whose content is the variant PIN to the comparison unit 802. The comparison unit 802 compares the first to-be-compared answer data with the first answer data (the variant digital code corresponding to the first user), and determines whether the two are consistent; after each sub-question is compared (which one or those sub-questions among the multiple sub-questions is/are the variant digital code of the first user), the determination result is obtained and first passed through the garbling unit 51 to generate the garbled determination result, and the comparison unit 802 sends the garbled determination result to the verifier 10; the verifier 10 de-garbles the garbled determination result received according to anti-eavesdropping protocol parameter, so as to further determine whether the identity verification-authentication of the user is successful; that is, whether the to-be-verified-authenticated user is the first user.

In summary, in addition to the aforesaid fingerprint extracting unit 200 and PIN processing unit 800, other feature extracting devices, such as the voiceprint extracting unit, the face extracting unit, the handwritten signature extracting unit, etc., can be integrated into the system of the present application, to provide the function of generating digital tokens including single or multiple variant unique features. Since the corresponding technical means are similar to those described above, they will not be described in details.

Figure 9A:
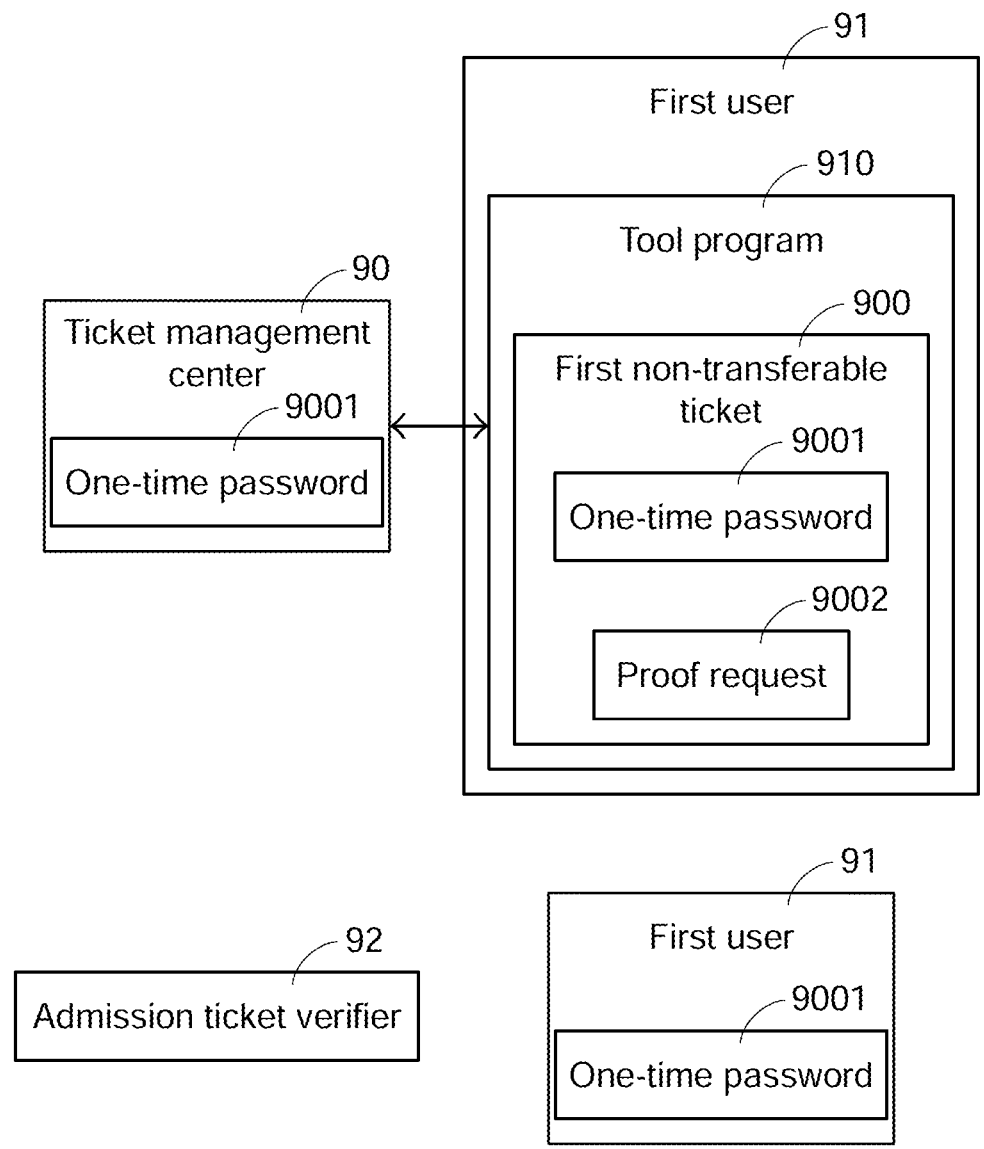
FIG. 9A is a functional block schematically illustrating another embodiment of a non-transferable ticket purchase and verification system developed by the present application according to the same concept.

Please refer to FIG. 9A, which is a functional block schematically another embodiment of a non-transferable ticket purchase and verification system developed by the present application according to the same concept, it can be applied to a management and verification of the non-transferable ticket performed by a first user 91 between a ticket management center 90 and an admission ticket verifier 92. Firstly, the first user 91 obtains a first non-transferable ticket 900 from the ticket management center 90, the first non-transferable ticket includes a one-time password (OTP) 9001 and a proof request 9002, the proof request 9002 includes a first variant unique feature and a first variant data. The first variant unique feature is generated by a variation operation by utilizing the variant data and a first unique feature provided by the first user 91.

For example, the first non-transferable ticket 900 can be a digital file, the first user 21 can utilize a hardware held by himself/herself to download and install a tool program 910, the tool program 910 can be issued by the ticket management center 90, and run on the hardware of the first user 91. Consequently, the first user 91 uses the tool program 910 to purchase the first non-transferable ticket 900 at the ticket management center 90 which exists in a form of a website.

In details, after a transaction between the first user 91 and the ticket management center 90 is approved (for example, a payment is successful), the ticket management center 90 can require the first user 91 to utilize the hardware held by himself/herself and the tool program 910 to extract the first unique feature (for example, the face, the fingerprint, the handwritten signature, or a voice password whose content can be customized and read out personally) that belongs to and is provided with himself/herself; then, the variation operation is performed to the first unique feature according to the first variant data that is randomly selected; and finally, the first variant unique feature is formed and composed into the proof request 9002. Then, the first user 91 utilizes the hardware held by himself/herself or the tool program 910 to send the proof request 9002 to the ticket management center 90; or the first user 91 directly sends the DID thereof to the ticket management center 90, the ticket management center 90 randomly selects the proof request sub-questions which had been generated by the first user 91 according to the DID, to compose the proof request 9002. Then, the ticket management center 90 encapsulates the OTP 9001 that is randomly selected and the proof request 9002 to form the first non-transferable ticket 900, and send back it to the first user 91, and thus the ticket delivery is completed.

The OTP 9001 is mainly generated by the ticket management center 90, is encapsulated in the first non-transferable ticket 900, and will be opened only after the proof request 9002 is successfully answered. The hardware (a smart phone or the like portable devices such as a wearable watch) held by the first user 91 can be used to store the first non-transferable ticket 900, the first non-transferable ticket 900 can also record a time stamp (or a similar code) when the first non-transferable ticket 900 was first generated and stored (for example, 10:38:25 AM on Jul. 30, 2021), and the timestamp can also be recorded simultaneously in the data field corresponding to the first non-transferable ticket 900 in the ticket management center 90. When the first non-transferable ticket 900 is transferred to any other portable device similar to a smart phone again, the time stamp of the first non-transferable ticket 900 can be set into "another stored time" (for example, AM 11:56:55 on Jul. 31, 2021). When the first user 91 arrives at the admission ticket verifier 92, the first user 91 can use the first non-transferable ticket 900 in the portable device to check the ticket.

Additionally, in order to increase flexibility of transfer, the tool program 910 can also be added with the function of reissuing tickets or transferring tickets. When the tickets are transferred between different users, the tool program 910 of the original user needs to notify the ticket management center 90; the first non-transferable ticket 900 is repackaged with a new proof request generated by the new user, and then stored again in the new user's portable device. In this way, the tickets in the present application can be transferred, but they needs to be processed and annotated by the ticket management center 90.

Figure 9B:
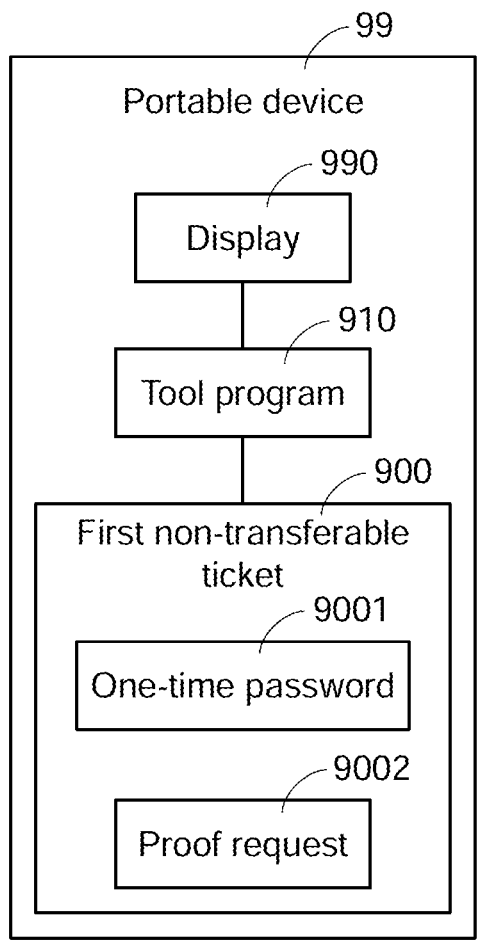
FIG. 9B is a functional block schematically illustrating a portable device 99 for storing a first non-transferable ticket 900.

Please refer to FIG. 9B, which is a functional block schematically the portable device 99 for storing a first non-transferable ticket 900. Methods of checking the tickets are as follows. As to a first method, in order to ensure that the ticket has not been transferred to others after it is sold, the ticket holder needs to use his/her unique feature (such as the face, the fingerprint, the handwritten signature, or the voice password whose content can be customized and read out personally) at the ticket check gate, and the one-time password 9001 in the first non-transferable ticket 900 will be opened only that the proof request 9002 is successfully answered. The successful answer to the proof request can be that the ticket holder uses the portable device 99 to acquire the unique feature at the ticket check gate, then uses the tool program 910 installed on the portable device 99 to compare the unique feature with the first variant data in the first non-transferable ticket to generate a to-be-compared variant unique feature, then generates a determination result according to a comparison of the to-be-compared unique feature and the first variant unique feature, and finally determines whether the ticket holder is the first user according to the determination result. If the ticket holder is the first user, then the display 990 in the portable device 99 can just display the OTP 9001 for the ticket reader of the admission ticket verifier 92 to read and check whether the OTP 9001 is a legal ticket. On contrast, if the determination result is that the ticket holder is not the first user, then the display 990 will not display the OTP 9001, thus the ticket holder cannot pass the ticket check and the admission thereof will be refused. For example, the OTP 9001 is a two-dimensional barcode, and the admission ticket verifier 92 only needs to be equipped with a two-dimensional barcode reader and a database that stores sold OTPs, so that it directly can scan the two-dimensional barcode to complete to check the ticket.

The format of the proof request in this embodiment can be similar to the above embodiments, the proof request can also includes a proof question set, and a proof request sub-question composed of the first variant unique feature and the first variant data can be included in the proof question set, and an answer corresponding to the proof question set is a bit string or a bit array. For example, the proof question set includes 16 sub-questions, in which the 3rd and the 12th sub-questions are the proof request sub-questions corresponding to the first user, while the other proof request sub-questions are corresponding to other users or other variant unique feature generated by other variant data. therefore, the answer set corresponding to the proof question set is a 16-bit string "0010000000010000". In this way, the tool program 910 installed on the portable device 99 obtains the determination result, and compares the determination result with the answer set; If the determination result and the answer set (the string "0010000000010000") are consistent, or a consistent rate thereof reaches a specific threshold, it will be determined that the identity verification authentication of the holder of this time is successful, and the OTP 9001 will be displayed.

Additionally, in order to reduce the time of checking the ticket, a second method can be used. As to the second method, the latest storage time of the first non-transferable ticket 900 is first checked, when the latest storage time thereof is consistent with the time of first generation and storage recorded in the ticket management center 90, the ticket will be directly passed. Because this situation represents that the first non-transferable ticket 900 has not been resold and is not transferred to another person's portable device. On contrast, when the latest storage time thereof is inconsistent with the first generation and storage time recorded in the ticket management center 90, it represents that the first non-transferable ticket 900 has been transferred to a different portable device, at this time, the admission ticket verifier 92 needs to require the ticket holder to use his/her own unique features (such as the fingerprints, the handwritten signatures, or the voice password that can be customized and read out personally) to respond to the proof request, so as to determine whether the OTP 9001 in the first non-transferable ticket 900 is opened to perform the aforesaid ticket checking process.

Certainly, in order to simplify the process, the verification method of the original identity management system on the smart phone can also be used to package the OTP 9001 in the first non-transferable ticket 900, for example, binding with the phone number or the IMEI serial number of the mobile phone; that is, the OTP 9001 in the first non-transferable ticket 900 must be opened on the mobile phone of the same mobile phone number or the same IMEI serial number, so that a probability of the ticket being transferred is greatly reduced. Moreover, this technical means can also be applied to the sale of package tickets. When multiple users purchase a non-transferable package ticket at the ticket management center 90, the proof request in the non-transferable package ticket includes the variant unique feature generated by the variation operation by utilizing a corresponding unique feature provided by each user, and the admission ticket verifier 92 need all the corresponding unique feature provided by the multiple user to open the OTP in the non-transferable package ticket, so as to complete the aforesaid ticket checking process. Of course, the portable device storing the first non-transferable ticket 900 can also be an exclusive souvenir of the activity.

Additionally, the technology of the present application can also be applied to the identity verification and authentication system of user devices such as smartphones or laptops, and then integrated with the system established by the Fast ID entity Online (FIDO) Alliance. Since the focus of FIDO technology lies in the generation and management of public and private key pairs related to user accounts, as for the identity verification and authentication of user, there is no significant difference between the methods commonly used on FIDO and traditional practices. Most of them perform unilateral authentications on the hardware held by the user, and the verifier which is required to log in cannot participate.

If DID technology is used to implement the user identity code in "Decentralized Zero Trust Identity Verification and Authentication System and Method" of the present application, and this user identity code is recorded during the FIDO registration stage, when the user performs the verification and authentication process during each login stage, in addition to the unilateral authentication (the password, the fingerprint or the face brush) performed on the hardware held by the user, the FIDO verifier can also perform the decentralized zero-trust identity verification authentication system and method described in the present application by utilizing the user identity code as the second factor to enhance security thereof.

For example, the user device can first obtain a unique feature (the fingerprint, the voiceprint or the face) corresponding to a user (a real person), then generate at least one variant unique feature according to the unique feature and a variant data, then generate a proof request by utilizing the variant unique feature, the proof request at least includes the variant data and an answer data, wherein the answer data includes the variant unique feature. The proof request generated thereby can be stored in the user device, but the unique feature previously obtained are deleted, so the unique feature corresponding to the user (the real person) will no longer be stored in the user device. Regardless of whether the user device is connected to Internet, when a to-be-verified-authenticated user wants the user device enter a normal use state (such as to obtain full access to the user device), the user device first obtains a to-be-authenticated unique feature (the fingerprint, the voiceprint or the face) corresponding to the to-be-verified-authenticated user, generates a to-be-compared data according to the to-be-authenticated unique feature of the be-verified-authenticated user and the variant data in the proof request; then generates a determination result according to a comparison of the to-be-compared answer data and the answer data in the proof request, and determines whether the to-be-verified-authenticated user is the user according to the determination result. If so, the user device is allowed to enter the normal use state or the FIDO function can be enabled normally. If not, the user device remains in a function-limited state or the FIDO functions cannot be enabled. The proof request will expire after the number of uses or usage time exceeds a preset value. At the same time, the user device can require the user to generate a new proof request to replace the expired proof request, and delete the unique feature obtained at that time. In this way, the user device will not store the unique feature corresponding to the user (the real person), and the user device does not need to be online on the time of performing the identity verification and authentication. Therefore, the above concept can also be applied to shared cars, motorcycles or cold wallets of cryptocurrency which cannot be connected to Internet at any time.

Moreover, a cryptocurrency wallet can also be another type of FIDO identity authenticator which can be used to generate, manage, and store public and private key pairs. While a cryptocurrency account is added, the user can bind a digital avatar produced by the "Decentralized Zero Trust Identity Verification and Authentication System and Method" of the present application depending on different application scenarios, and the user identity code corresponding to the digital avatar is managed and stored by the cryptocurrency wallet. By completing the verification means of the digital avatar, the cryptocurrency account corresponding to the digital avatar in the cryptocurrency wallet can be successfully accessed. Additionally, in order to associate a certain cryptocurrency account with a digital avatar, the aforesaid technical means of the non-transferable tickets can be used to encapsulate a password corresponding to the cryptocurrency account and a proof request related to the digital avatar in the non-transferable ticket, and store the non-transferable ticket in specific hardware or a database whose contents cannot be tampered, and the password corresponding to the cryptocurrency account in the non-transferable ticket can only be opened by utilizing the unique feature of the digital avatar to answer the proof request successfully. In this way, the technology of the present application can provide another technical means to safely store the password of the cryptocurrency account.

Figure 10:
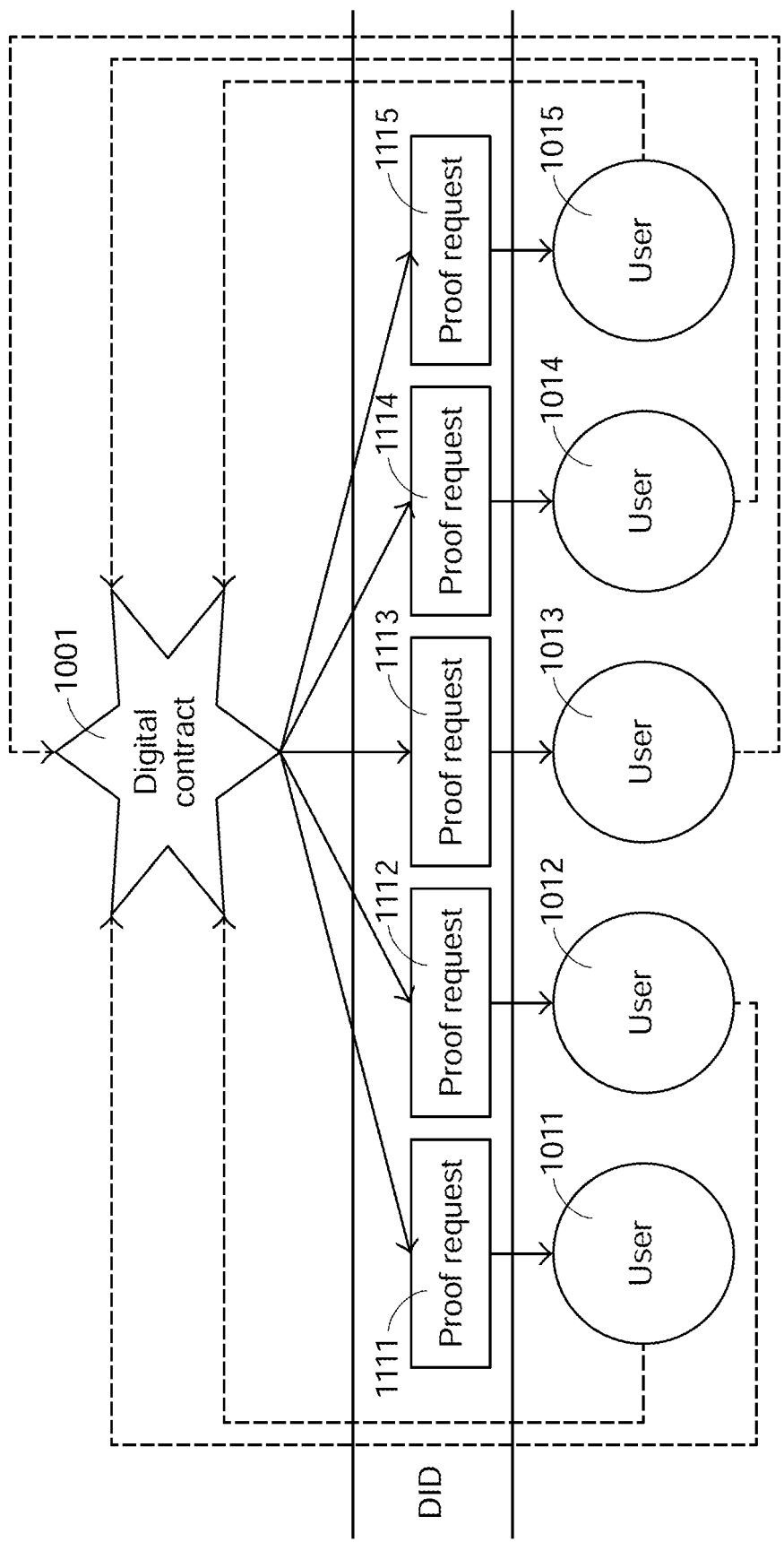
FIG. 10 is a functional block schematically illustrating the technology of the present application applied to the verification and authorization process of entities, enterprises, organizations or even decentralized autonomous organization (DAO).

Please refer to FIG. 10, which is a functional block schematically illustrating the technology of the present application applied to the verification and authorization process of entities, enterprises, organizations or even decentralized autonomous organization (DAO), it can mainly be regarded as a method of signing digital contracts. In this example, suppose there is an online digital contract (or a smart contract on the blockchain) 1001, it requires five signatures and approvals of specific users (users 1011-1015) thereon to be confirmed or effective. Consequently, the digital contract 1001 can issue the contract content encapsulated by proof requests 1111-1115 corresponding to the specific users 1011-1015 respectively, till the five specific users 1011-1015 performs the identity verification and authentication by the identity verification and authentication mechanism of the present application, and correctly response the corresponding proof requests with the unique features of the digital avatar respectively, the content of the digital contract can be correctly opened to allow the corresponding specific users read and confirm, and the digital contract will be signed and effective until all five users confirmed it.

Additionally, the core technology of the present application can also be applied to an advertising benefit sharing mechanism. For example, the user installs a dedicated application in a user device (the smartphone, the personal computer or the shared KIOSK) or uses a browser to access a portal website, the user interface provided by the dedicated application and the portal website can be embedded with an advertising pages provided by advertisers, and the cost of advertising can be charged by the dedicated application provider and the portal website builder. The portal website here can be a shopping website, video sharing platform, social networking website or online game website.

In the stage of producing the avatar of the user, the user can first obtain the unique features (enter the PIN code or provide the fingerprint) corresponding to the user through the user device (the smartphone, the personal computer or the shared KIOSK), and generate a plurality of variant unique features according to the unique feature and a plurality of variant data, the user device will then completely delete the temporarily stored PIN code or fingerprint, but upload the plurality of variant data-variant unique features to a database whose content cannot be tampered. After the plurality of variant data-variant unique features are successfully uploaded, a maintainer of the database, a provider of the dedicated application, a builder of the portal website or an advertiser issues benefits (such as reward tokens) to an exclusive account of the user.

Third-party service (such as logging into an online bank account, logging into a shopping website account, logging into a video sharing platform account, logging into an online gaming website account, or logging into a social networking website account) providers can link to the database to obtain the plurality of variant data-variant unique features, to generate a proof request by utilizing the plurality of variant data-variant unique features. The third-party service provider who obtains the plurality of variant data—the variant unique features needs to provide corresponding benefits (such as fees or reward tokens) to the maintainer of the database, the provider of the dedicated application, the builder of the portal website.

When a to-be-verified-authenticated user uses the dedicated application or the portal website to log into the third-party service, the to-be-verified-authenticated user can provide one of to-be-verified-authenticated unique features (enter a PIN or provide a fingerprint) of his/her own to generate a to-be-compared answer data, then generate a determination result according to a comparison of the to-be-compared answer data and the answer data in the proof request, and finally determine whether the to-be-verified-authenticated user is the user according to the determination result.

Additionally, in addition to the identity verification and authentication of natural persons and pets having biometric features, the technology of the present application can also be applied to the identity verification and authentication between IoT objects, for example, in a stage of producing hardware, the IoT object can be personalized in a security-certified factory, and the DID can be assigned as the identity code of the IoT object, a unique feature of the IoT object can be accomplished with PUF technology, then the avatar production in "Decentralized Zero Trust Identity Verification and Authentication System and Method" of the present application is completed, and multiple proof request sub-questions are generated in the corresponding proof request database. In a stage of the initializing the IoT object, the verifier can use "Decentralized Zero Trust Identity Verification and Authentication System and Method" of the present application to perform the identity verification and authentication to the IoT object, to confirm that it is one of IoT objects manufactured by the factory of the security certification passed. The IoT object can also use the location-specific information (such as GPS location) as its second unique feature, and use the second unique feature and the first unique feature to further generate more proof request sub-questions to enrich the proof request database thereof. In this way, in a operation stage, one IoT object can use the "Identity Verification and Authentication System and Method" of the present application to verify and authenticate the identity of the other IoT object between the two IoT objects so as to accomplish "Decentralized Zero Architecture" between the IoT objects. By simultaneously utilizing the first unique feature and the second unique feature to perform the identity verification and authentication of the IoT object, intrusion events in which remote IoT objects impersonate genuine IoT objects can be effectively prevented, and another type of intrusion event in which genuine IoT objects are plugged, removed and replaced can also be effectively prevented at the same time.

In summary, the technical means disclosed in the present application can be applied to the identity verification and authentication of natural persons and IoT objects, and the technical means of the present application do not need to retain unnecessary personal privacy information in the database of the verifier, so it is especially suitable for those company who need to comply with the Personal Information Protection Act., such as the European Union's General Data Protection Regulation (GDPR). Although the present invention is disclosed in the above embodiments, they are not intended to limit the present invention. Those with ordinary knowledge in the technical field to which the present invention belongs can make various modifications and modifications without departing from the technical spirit and scope of the present invention.

What is claimed is:

1. An identity verification-authentication method, for verifying and authenticating a user, comprising:
   acquiring a unique feature provided by the user, and generating a first digital token which comprises a first variant unique feature according to the unique feature and a first variant data;
   generating a first proof request according to the first digital token, wherein the first proof request at least comprises the first variant data and a first answer data, and the first answer data comprises the first variant unique feature;
   acquiring a to-be-authenticated unique feature corresponding to a to-be-verified-authenticated user, and generating a first to-be-compared answer data according to the to-be-authenticated unique feature of the to-be-verified-authenticated user and the first variant data in the first proof request;
   generating a first determination result according to a comparison of the first to-be-compared answer data and the first answer data in the first proof request; and determining whether the to-be-verified-authenticated user is the user according to the first determination result;
   generating a second digital token which comprises a second variant unique feature according to the unique feature and a second variant data;
   generating a second proof request according to the second digital token, wherein the second proof request at least comprises the second variant data and a second answer data, and the second answer data comprises the second variant unique feature;
   generating a second to-be-compared answer data according to the to-be-authenticated unique feature of the to-be-verified-authenticated user and the second variant data in the second proof request; and
   generating a second determination result according to a comparison of the second to-be-compared answer data and the second answer data in the second proof request; and determining whether the to-be-verified-authenticated user is the user according to the first determination result and the second determination result.

2. The identity verification-authentication method according to claim 1, wherein the user is one of a natural person, an information device, a robot, an Internet of Things (IoT) object, and an asset object having the unique feature; the unique feature of the natural person is a secret that the user keeps with him/her and can take out repeatedly, the secret is one of a combination of a personal identification number (PIN) in memory, a handwritten signature or symbol, a pass code pronounced by himself/herself, a special gesture or habitual body movement, and one or more biometric features; the unique feature of the information device, the robot, the IoT object, or the asset object is an electronic fingerprint, which is generated by a physically unclonable function (PUF) security technology in an integrated circuit chip, or the electronic fingerprint added with specific location information of the information device, the robot, the IoT object, or the asset object.

3. The identity verification-authentication method according to claim 1, wherein the first variant data comprised in the first proof request is an information required to generate the first answer data, the first answer data can be generated by the user in an avatar producing stage utilizing the unique feature thereof and the first variant data, the first answer data is stored in an accessible database, and the unique feature cannot be reversely extrapolated according to the first answer data and the first variant data; the database is a public but untemperable digital ledger system having a plurality of proof request sub-questions stored therein, each one of the proof request sub-questions can comprise a variant data and an answer data corresponding to a specific user; in response to a verification request issued by the user, a proof question set and an answer set can be selected and generated from the plurality of proof request sub-questions in the database according to an identity code representing the user, the determination result is generated according to a comparison of the proof question set and a to-be-compared answer set generated corresponding to the proof question set, and then whether the identity verification-authentication of the user is successful is determined according to the determination result being consistent with the answer set or not.

4. An identity verification-authentication system, for verifying and authenticating at least a first user, comprising:
   a first prover, for acquiring a first unique feature provided by the first user; and
   a verifier, in communication with the first prover, for generating a first proof request, wherein the verifier at least sends a first variant data in the first proof request to the first prover, the first prover generates a first to-be-compared answer data according to the first unique feature provided by the first user and the first variant data, the first prover or the verifier generates a determination result according to a comparison of the first to-be-compared answer data and a first answer data in the first proof request, and then determines whether an identity verification-authentication of the first user is successful according to the determination result; and a second prover, for acquiring a second unique feature provided by the second user;

wherein the verifier, also in communication with the second prover, for generating a second proof request, wherein the verifier at least sends a second variant data in the second proof request to the second prover, the second prover generates a second to-be-compared answer data according to the second unique feature provided by the second user and the second variant data, the second prover or the verifier generates other one determination result according to a comparison of the second to-be-compared answer data and a second answer data in the second proof request, and then determines whether an identity verification-authentication of the second user is successful according to the other one determination result.

5. The identity verification-authentication system according to claim 4, wherein the verifier sends the first variant data and the first answer data in the first proof request to the first prover, the first prover generates the first to-be-compared answer data according to the unique feature provided by the first user and the first variant data, the first prover generates the determination result according to the comparison of the first to-be-compared answer data and the first answer data in the first proof request, and the verifier determines whether the identity verification-authentication of the first user is successful according to the determination result.

6. The identity verification-authentication system according to claim 4, wherein the verifier only sends the first variant data in the first proof request to the first prover, the first prover generates the first to-be-compared answer data according to the unique feature provided by the first user and the first variant data, and sends the first to-be-compared answer data to the verifier, the verifier generates the determination result according to the comparison of the first to-be-compared answer data and the first answer data in the first proof request, and the verifier determines whether the identity verification-authentication of the first user is successful according to the determination result.

7. The identity verification-authentication system according to claim 4, wherein the verifier comprises a proof request database having a plurality of proof request sub-questions stored therein, each one of the proof request sub-questions can comprise a variant data and an answer data corresponding to a specific user; and a verification executing unit, for selecting and generating a proof question set and an answer set from the plurality of proof request sub-questions in the proof request database according to an identity code comprised in a verification request, the first proof request is the proof question set generated according to the identity code of the first user, the first prover or the verification executing unit generates the determination result according to the comparison of the to-be-compared answer data and the first answer data in the proof request, and then determines whether the identity verification-authentication of the first user is successful according to the determination result being consistent with the answer set or not; wherein the identity code is selected from one of a decentralized identity (DID), an identity number belonging to the first user, a mobile phone number and a username defined by the first user, when the decentralized identity is selected as the identity code, the unique feature of the first user can be associated with a non-fungible token (NFT) on a blockchain, so as to achieve an effect that natural person own digital assets, a question bank of new proof request sub-questions is generated after an avatar producing stage of the first user and every important transaction, the plurality of proof request sub-questions can be deemed as the NFT belonging to the first user, the NFT represents a proof that the first user authorizes the important transaction, a group of the NFTs can be considered as the first user's personal credit rating record or even record of the unique feature that changes over time, these records can be pointed to the first user across devices, and can be used as important references in other services of health insurance, financial credit, or even a consensus mechanism on a blockchain.

8. The identity verification-authentication system according to claim 4, wherein the first prover comprises a signal transceiver, in communication with the verifier, which takes out the first variant feature in the first proof request received; a parameter processing unit, in communication with the signal transceiver, which outputs a set of variation control parameters according to the first variant data; a biometric feature extracting unit, in communication with the parameter processing unit, which is used to extract at least one biometric feature of the first user, the biometric feature extracting unit has a variety of biometric feature extraction and conversion rules, can switch the biometric feature extraction and conversion rules according to a content of the variation control parameters output by the parameter processing unit, then switch the biometric feature extraction and conversion rule corresponding to the set of variation control parameters to perform biometric feature extraction and conversion, finally generate and send the first to-be-compared answer data comprising a variant biometric feature; and a comparison unit, in communication with the biometric extracting unit and the signal transceiver, which is used to compare the first to-be-compared answer data and the first answer data in the first proof request, and then to determine whether the two are consistent.

9. The identity verification-authentication system according to claim 8, wherein the biometric feature is the unique feature of single fingerprint, permutations and combinations of multiple fingerprints, a voiceprint, a face, a handwritten signature or a gait, the first proof request comprises a proof question set, data types of the proof question set comprises a time stamp, a name issuing a challenge, a question combination composed of the plurality of proof request sub-questions, each one of the proof request sub-questions is taken from the proof request database; the first prover packages the comparing and the determining with a technology of multi-party computation, completes the comparison of the first to-be-compared answer data and the first answer data in the first proof request, to reduce computation of the first prover itself.

10. The identity verification-authentication system according to claim 8, wherein the first prover further comprises a garbling unit and a de-garbling unit, a garbling operation is performed to any variant biometric feature data in a plurality of variant biometric feature by the garbling unit according to a garbler parameter, a garbled variant biometric feature data is generated and sent to a proof request database at a remote end for storage, to enrich numbers and types of proof request sub-questions in the proof request database; the de-garbling unit performs a de-garbling operation to the garbled variant biometric feature data of the first user, to get back the variant biometric feature data corresponding to the first user, and to send it to the comparison unit.

11. The identity verification-authentication system according to claim 10, wherein the first proof request sent by the verifier further comprises an anti-eavesdropping protocol parameter determined by the verifier, the determination result obtained by the comparison unit is first passed through the garbling unit to generate a garbled determination result, and the comparison unit sends the garbled determination result to the verifier; the verifier de-garbles the garbled determination result received according to anti-eavesdropping protocol parameter determined thereby, so as to further determine whether the identity verification-authentication of the first user is successful.

12. The identity verification-authentication system according to claim 10, further comprising a first user garbling corresponding unit exclusively belonging to the first user, the first user garbling corresponding unit has stored a garbler parameter table exclusively belonging to the first user that can be read by the parameter processing unit; the biometric feature extracting unit has the variety of biometric feature extraction and conversion rules, can switch the biometric feature extraction and conversion rules according to the content of the variation control parameters output by the parameter processing unit, and can generate the plurality of variant biometric features different each other while the same biometric feature is as a base; after the garbling unit performs the garbling operation to any variant biometric feature data in the plurality of variant biometric features according to the garbler parameter table read from the first user garbling corresponding unit and a garbler parameter generated by a random number, the garbled variant biometric feature data is generated and sent to the proof request database at the remote end through the signal transceiver, to enrich the numbers and types of the proof request sub-questions in the proof request database.

13. The identity verification-authentication system according to claim 12, wherein the proof request database in the verifier has stored the plurality of proof request sub-questions that are untamperable, and can be enriched by the proof request sub-questions that are generated and sent back by the first prover at a remote end; the first prover is an identity proof device having biometric feature extracting function, and the proof request sub-question sent back thereby comprises a data packet of a biometric feature parameter, the garbler parameter and the garbled variant biometric feature data; the verifier comprises a noise mixer, which is used to perform a sub-region partition to the first answer data in the proof request sub-question, and to select certain sub-regions for noise mixing, so as to increase difficulty of comparing the first answer data; the first prover can clearly indicate the regions with noise added and a method of adding noise, so that an answer array is obtained through the comparing, the sub-regions without noise added and the sub-regions with noise added are marked with different values respectively in the answer array, the sub-regions with noise added are further marked with different values depending on the method of adding noise, and then the answer array is sent to the verifier for further strong verification.

14. An identity verification-authentication method, for verifying and authenticating a digital avatar, comprising following steps: generating a first digital token according to a unique feature corresponding to the digital avatar and a variant data; uploading the digital token to an untamperable digital ledger, wherein the digital token comprises a variant unique feature related to the unique feature; generating a proof request according to the digital token on the untamperable digital ledger, wherein the proof request at least comprises the variant data and an answer data, the answer data comprises the variant unique feature; generating a to-be-compared answer data according to the variant data of the proof request and a to-be-authenticated unique feature corresponding to a to-be-authenticated digital avatar; generating a determination result according to a comparison of the to-be-compared answer data and the answer data in the proof request; and determining whether the to-be-authenticated digital avatar is the digital avatar according to the determination result.

15. An identity verification-authentication method, applied to a user device, comprising following steps:
after the user device acquired a unique feature corresponding to a user, at least generating a variant unique feature according to the unique feature and a variant data;
generating a proof request by utilizing the variant unique feature, wherein the proof request at least comprises the variant data and an answer data, the answer data comprises the variant unique feature, the proof request generated is stored in the user device, and the unique feature previously acquired is deleted;
when a to-be-verified-authenticated user wants the user device enter a normal use state, the user device first acquires a to-be-authenticated unique feature corresponding to the to-be-verified-authenticated user, and generates a to-be-compared answer data according to the to-be-authenticated unique feature of the to-be-verified-authenticated user and the variant data in the proof request;
generating a determination result according to a comparison of the to-be-compared answer data and the answer data in the proof request; and determining whether the to-be-verified-authenticated user is the user according to the determination result;
wherein the user device is a carsharing, a motorcycle, a cryptocurrency cold wallet, a smartphone or a notebook computer, which completes integration with a system established by fast identity online (FIDO) alliance, the proof request will expire and become invalid after a number of uses or usage time exceeds a preset value; and
wherein at the same time, the user device will ask the user to generate a new proof request to replace the expired proof request, and delete the unique feature acquired at that time; on a time of performing identity verification-authentication, the user device does not need to be online.

16. An identity verification-authentication method, applied between IoT objects, comprising following steps: providing an IoT object; in a hardware producing stage, giving the IoT object a corresponding and only identity code and a first unique feature, and utilizing the identity code and the first unique feature to generate at least a digital token and to store the digital token in a proof request database; in an initialization stage, performing an identity verification-authentication to the IoT object by a verifier using the identity verification-authentication method recited in claim 1, using a special information of a location of the IoT object that passed the identity verification-authentication as a second unique feature, and using the second unique feature and the first unique feature to further generate more proof request sub-questions, so as to enrich the proof request database; and in an operation stage, other one IoT object uses the identity verification-authentication method recited in claim 1, the first unique feature and the second unique feature are concurrently utilized to perform the identity verification-authentication of the other one IoT object.

\* \* \* \* \*